(12) United States Patent
Tsuchida et al.

(10) Patent No.: US 9,286,535 B2
(45) Date of Patent: Mar. 15, 2016

(54) IMAGE PROCESSING DEVICE, IMAGE PROCESSING METHOD, AND IMAGING DEVICE

(71) Applicant: OLYMPUS CORPORATION, Tokyo (JP)

(72) Inventors: Ryusuke Tsuchida, Tokyo (JP); Yoshinobu Tanaka, Tokyo (JP); Takashi Yanada, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 14/560,773

(22) Filed: Dec. 4, 2014

(65) Prior Publication Data
US 2015/0163432 A1     Jun. 11, 2015

(30) Foreign Application Priority Data
Dec. 9, 2013     (JP) .................................. 2013-254123

(51) Int. Cl.
H04N 5/217     (2011.01)
H04N 5/228     (2006.01)
H04N 5/225     (2006.01)
G06K 9/54      (2006.01)
G06K 9/46      (2006.01)
H04N 19/50     (2014.01)

(52) U.S. Cl.
CPC . G06K 9/46 (2013.01); H04N 19/50 (2014.11)

(58) Field of Classification Search
CPC ..... H04N 9/045; H04N 5/232; H04N 5/3655; H04N 19/50
USPC .......... 348/241, 222.1, 207.99; 382/108, 278, 382/307; 375/240.16
See application file for complete search history.

(56) References Cited

U.S. PATENT DOCUMENTS

| | | | | |
|---|---|---|---|---|
| 2009/0073277 A1* | 3/2009 | Numata | ............... | H04N 19/139 348/222.1 |
| 2012/0008685 A1* | 1/2012 | Sasaki | .................. | H04N 19/105 375/240.13 |
| 2012/0027092 A1* | 2/2012 | Matsui | ................. | H04N 19/105 375/240.16 |
| 2012/0057049 A1* | 3/2012 | Imagawa | ........... | H04N 5/23232 348/234 |
| 2012/0147960 A1* | 6/2012 | Sato | ....................... | H04N 19/51 375/240.16 |

FOREIGN PATENT DOCUMENTS

JP     2007-088910 A     4/2007

* cited by examiner

*Primary Examiner* — Sinh Tran
*Assistant Examiner* — Xi Wang
(74) *Attorney, Agent, or Firm* — Westerman, Hattori, Daniels & Adrian, LLP

(57) ABSTRACT

An image processing device includes an extended region sum of absolute differences (SAD) calculation unit configured to define each of an extended target region obtained by combining a plurality of predetermined target regions for each target pixel and an extended reference region obtained by combining a plurality of predetermined reference regions for each corresponding reference pixel and output an extended SAD calculation result obtained by performing SAD calculation based on values represented by pixel signals of pixels included in the extended target region and the extended reference region, and subtraction processing units equal in number to the target pixels to be simultaneously correlated and configured to correspond to the plurality of target pixels and output SAD calculation results obtained by performing subtraction processes based on the extended SAD calculation result and an SAD calculation result of a region which is not included in a target region.

8 Claims, 12 Drawing Sheets

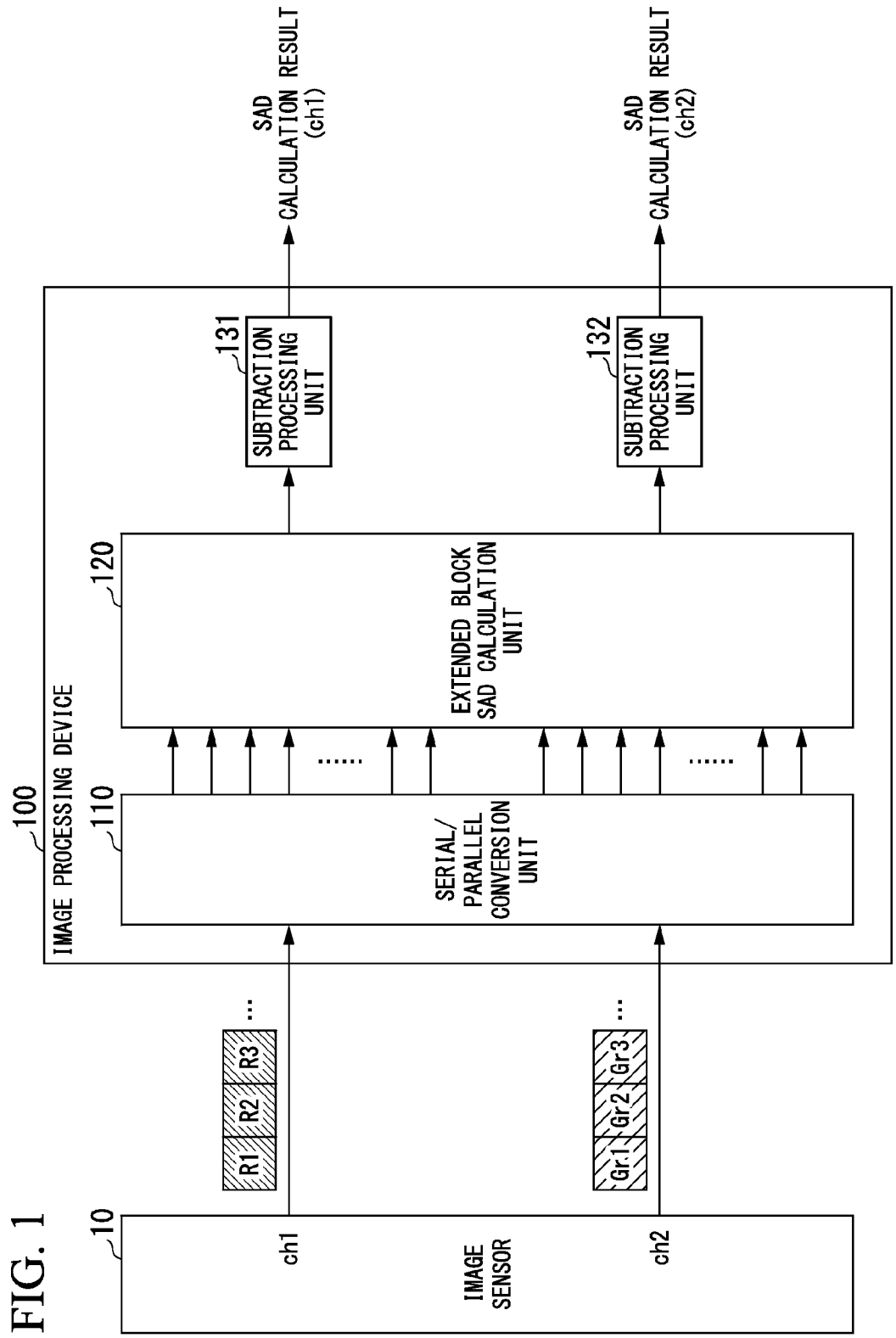

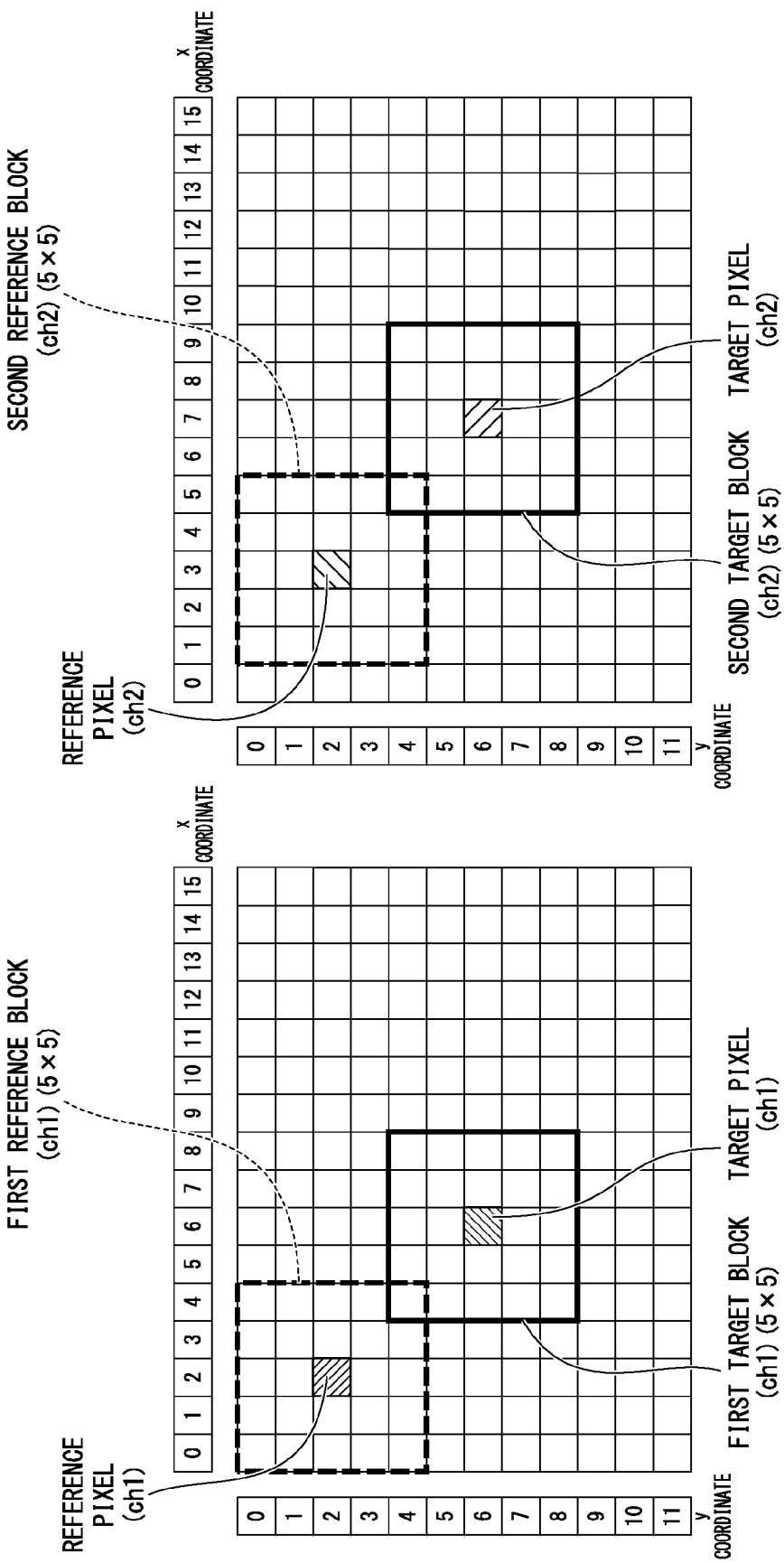

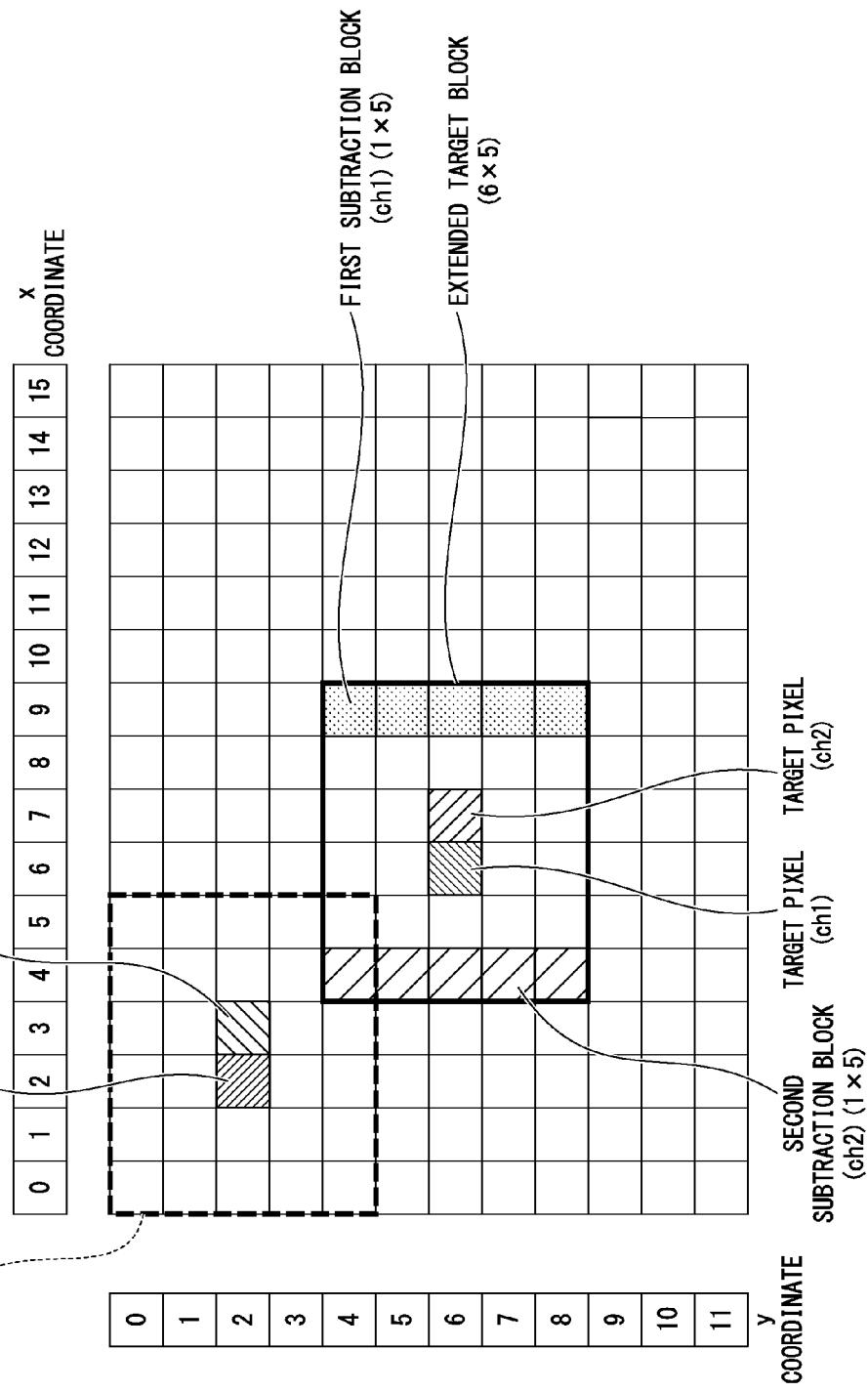

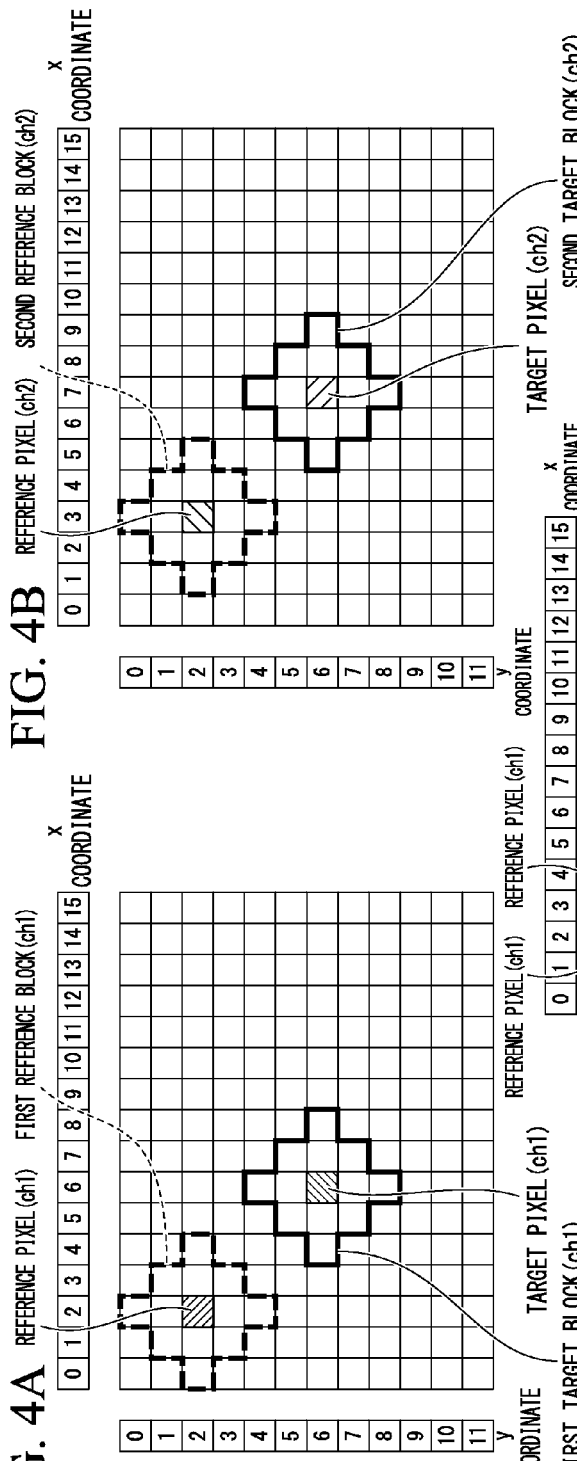

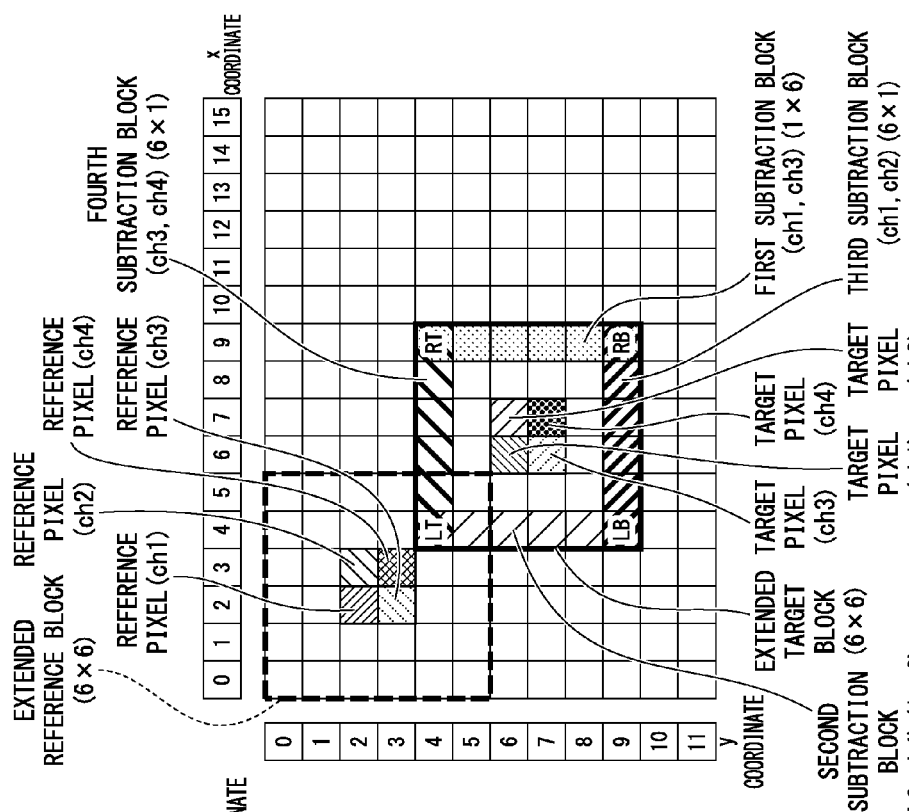
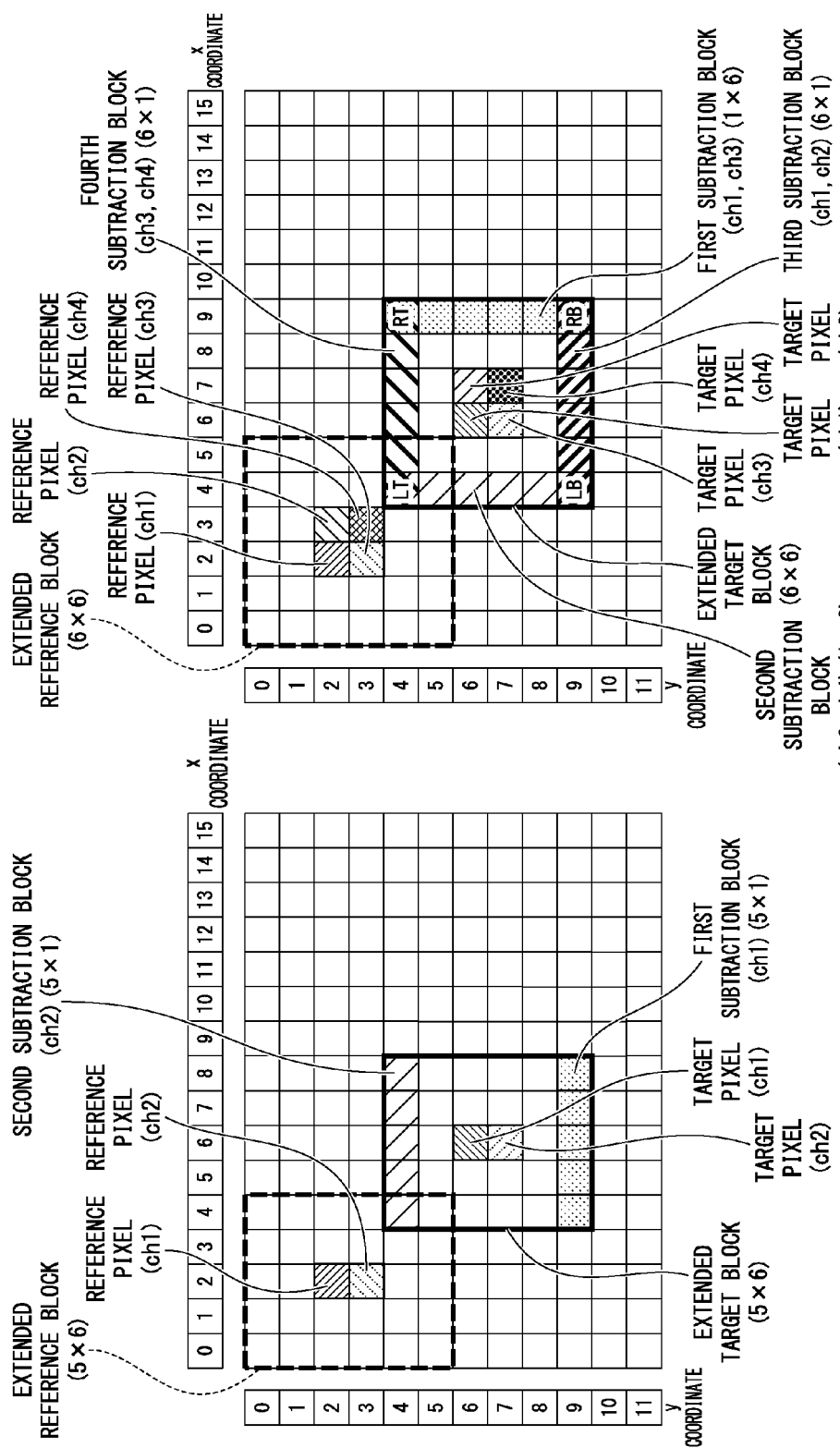

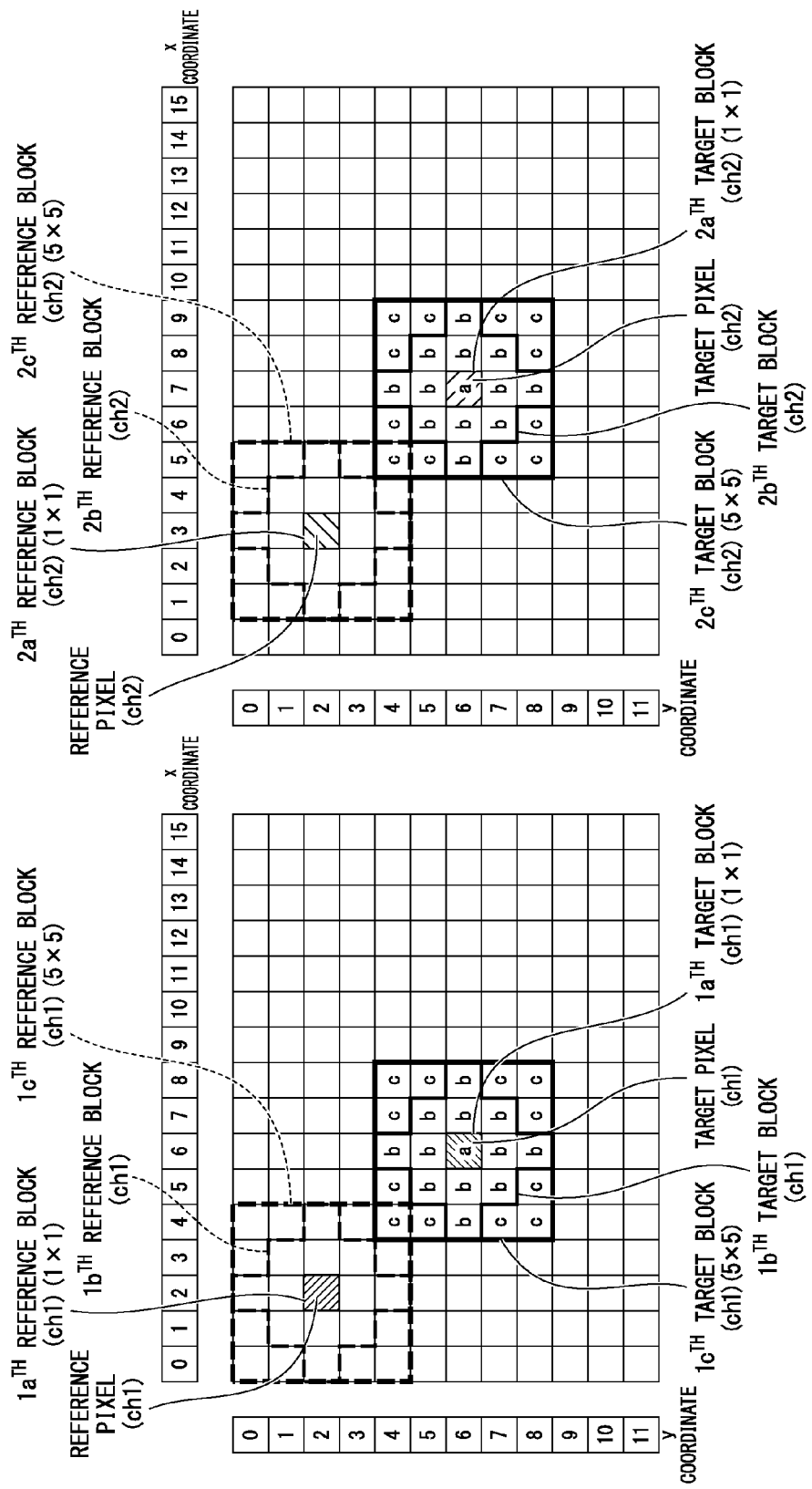

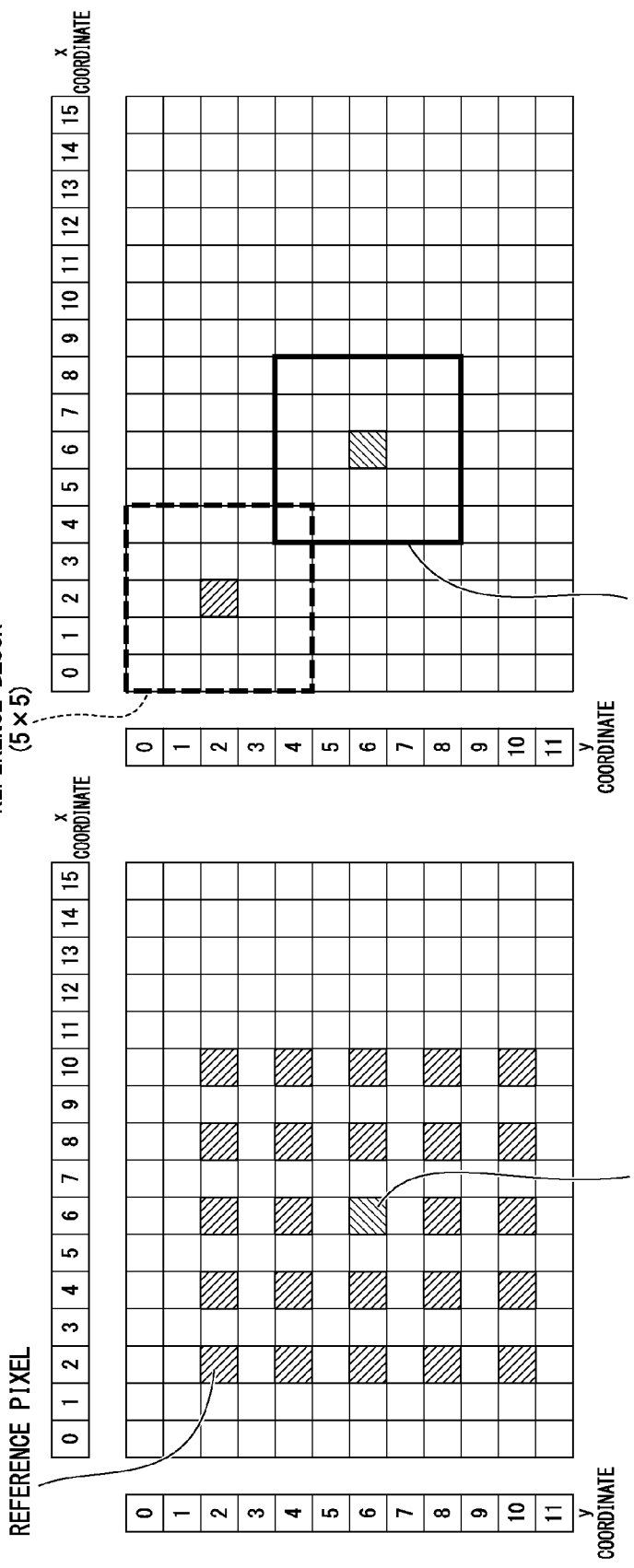

IMAGE PROCESSING DEVICE, IMAGE PROCESSING METHOD, AND IMAGING DEVICE

BACKGROUND OF THE INVENTION

1. Field of the Invention

The present invention relates to an image processing device, an image processing method, and an imaging device.

Priority is claimed on Japanese Patent Application No. 2013-254123, filed Dec. 9, 2013, the content of which is incorporated herein by reference.

2. Description of Related Art

In photographing by an imaging device such as a digital camera, various processing is performed on a signal of each pixel (hereinafter referred to as a "pixel signal") output from a solid-state imaging device provided in the imaging device. This processing is image processing for forming an image captured by the solid-state imaging device, processing for control related to photographing by the imaging device, or the like.

For the image processing to be performed by the imaging device, by finding a correlation between a target pixel within an image captured by the solid-state imaging device and a pixel of the same color positioned in the vicinity of the target pixel (hereinafter referred to as a "reference pixel"), the degree of similarity between the target pixel and the reference pixel is obtained to use a result of the degree of similarity in image processing. As a technique of finding the correlation between the target pixel and the reference pixel, block matching by calculation of a sum of absolute differences (SAD) is widely known. For example, in the publication of Japanese Unexamined Patent Application, First Publication No. 2007-088910, technology for finding a correlation through the block matching between a criterion block having a specific region including a target pixel and a reference block having a region including a reference pixel and having the same size as the criterion block is disclosed.

In this block matching technique based on SAD calculation, an absolute value of a pixel value difference between pixels positioned in the same coordinates in the target block including a region having a predetermined size around the target pixel and the reference block including a region having the same size as the target block around the reference pixel is calculated, and difference absolute values calculated for all pixels included in the target block are integrated.

For example, as illustrated in FIG. 12A, the case in which a correlation between a target pixel (6, 6) of a coordinate position of the horizontal direction x=6 and the vertical direction y=6 and a reference pixel (2, 2) of a coordinate position of the horizontal direction x=2 and the vertical direction y=2, that is, a reference pixel of a coordinate position shifted by −4 in the horizontal direction and −4 in the vertical direction from the coordinate position of the target pixel, is found is considered. At this time, as illustrated in FIG. 12B, a region of a target block is designated as a region of 5-by-5 pixels in the horizontal and vertical directions around the target pixel, that is, a region of 5 pixels×5 pixels, and a reference block is designated as a region of 5 pixels×5 pixels having the same size as the target block around the reference pixel. In this case, it is possible to obtain a result of SAD calculation (hereinafter referred to as an "SAD calculation result") according to the following Equation (1) in the SAD calculation for the target block.

$$SAD(x, y) = \sum_{-2 \leq i \leq 2, -2 \leq j \leq 2} |A(x+i, y+j) - B(x+i-4, y+j-4)| \quad (1)$$

In the above Equation (1), SAD(x, y) represents an SAD calculation result corresponding to a target block around a target pixel (x, y) positioned in a coordinate position of the horizontal direction x and the vertical direction y. In addition, in the above Equation (1), A(x, y) represents a pixel value of a pixel within the target block around the target pixel (x, y) positioned in a coordinate position of the horizontal direction x and the vertical direction y, and B(x, y) represents a pixel value of a pixel within a reference block corresponding to each pixel within the target block around the target pixel (x, y) positioned in the coordinate position of the horizontal direction x and the vertical direction y. In addition, in the above Equation (1), i and j are integers. Moreover, a coordinate position of the horizontal direction x and the vertical direction y is also shifted by "−4" in the pixel value B(x, y) of a pixel within the reference block of the above Equation (1) because a coordinate position of each pixel within the reference block is a coordinate position shifted by −4 in the horizontal direction and −4 in the vertical direction from a coordinate position of each corresponding pixel included within the target block.

In recent years, in order to cope with the recent speed-up of imaging devices, a solid-state imaging device for simultaneously outputting a plurality of pixel signals is mounted on an imaging device in many cases. Also, an output form of the solid-state imaging device for simultaneously outputting the plurality of pixel signals, for example, is a form in which pixel signals of two pixels adjacent in the horizontal direction are simultaneously output, a form in which pixel signals of two pixels adjacent in the vertical direction are simultaneously output, or the like. In addition, there is a form in which pixel signals of two pixels adjacent in the horizontal direction and pixel signals of two pixels adjacent in the vertical direction, that is, the pixel signals of the four pixels, are simultaneously output.

It is necessary to simultaneously perform SAD calculations based on pixels to be simultaneously output when SAD calculation is performed in such an imaging device equipped with the solid-state imaging device for simultaneously outputting a plurality of pixel signals. Because of this, the conventional imaging device corresponds to a solid-state imaging device for simultaneously outputting a plurality of pixels signals by providing SAD calculation units equal in number to channels through which pixel signals from the solid-state imaging device are simultaneously output, wherein the SAD calculation unit includes calculation circuits configured to calculate a difference absolute value for one pixel and the number of calculation circuits is the same as the number of pixels included in the target block (5×5=25 in the case of FIGS. 12A and 12B) within an image processing unit configured to perform image processing on pixel signals output from the solid-state imaging device.

SUMMARY OF THE INVENTION

According to a first aspect of the present invention, an image processing device, to which pixel signals of a plurality of adjacent pixels are simultaneously input, is configured to simultaneously find correlations between a plurality of target pixels adjacent to each other and corresponding reference pixels with pixels around the plurality of target pixels for each of the plurality of target pixels, and includes: an extended region sum of absolute differences (SAD) calculation unit configured to define each of an extended target region obtained by combining a plurality of target regions predetermined for each of the plurality of target pixels adjacent to each other to be simultaneously correlated and an extended reference region, which corresponds to the extended target region, obtained by combining a plurality of reference regions predetermined for each of reference pixels corresponding to the plurality of target pixels, the extended region SAD calculation unit being configured to output an extended SAD calculation result obtained by performing SAD calculations based on values represented by pixel signals of pixels included in the defined extended target region and the defined extended reference region; and subtraction processing units equal in number to the target pixels adjacent to each other to be simultaneously correlated, the subtraction processing units being configured to correspond to the plurality of target pixels and to output SAD calculation results obtained by performing subtraction processes based on the extended SAD calculation result and an SAD calculation result corresponding to a region of a peripheral pixel which is not included in a predetermined target region for the plurality of target pixels to which the subtraction processing units correspond.

According to a second aspect of the present invention, in the image processing device according to the first aspect of the present invention, the extended region SAD calculation unit may define each of the extended target region obtained by combining a first target region having a predetermined size including peripheral pixels to be correlated around a first target pixel which has been input and a second target region having a predetermined size including peripheral pixels to be simultaneously correlated around a second target pixel which has been simultaneously input and the extended reference region obtained by combining a first reference region having a predetermined size corresponding to the first target region around a first reference pixel corresponding to the first target pixel and a second reference region having a predetermined size corresponding to the second target region around a second reference pixel corresponding to the second target pixel, calculate difference absolute values between values represented by pixel signals of pixels positioned in the same coordinates in the extended target region and the extended reference region, and output the extended SAD calculation result obtained by performing the SAD calculation of integrating the calculated difference absolute values. A first subtraction processing unit, which is one of the subtraction processing units corresponding to the first target pixel, may output a first SAD calculation result obtained by subtracting an SAD calculation result corresponding to a region of a pixel which is not included in the first target region within the extended target region from the extended SAD calculation result. A second subtraction processing unit, which is another of the subtraction processing units corresponding to the second target pixel, may output a second SAD calculation result obtained by subtracting an SAD calculation result corresponding to a region of a pixel which is not included in the second target region within the extended target region from the extended SAD calculation result.

According to a third aspect of the present invention, in the image processing device according to the second aspect of the present invention, the extended region SAD calculation unit may output each of a first subtraction SAD calculation result obtained by performing the SAD calculation based on values represented by pixel signals of pixels positioned in the same coordinates in a region of pixels within the extended target region which is not included in the first target region and a region of pixels within the extended reference region which is not included in the first reference region corresponding to the region of pixels within the extended target region which is not included in the first target region and a second subtraction SAD calculation result obtained by performing the SAD calculation based on values represented by pixel signals of pixels positioned in the same coordinates in a region of pixels within the extended target region which is not included in the second target region and a region of pixels within the extended reference region which is not included in the second reference region corresponding to the region of pixels within the extended target region which is not included in the second target region. The first subtraction processing unit may output the first SAD calculation result obtained by subtracting the first subtraction SAD calculation result from the extended SAD calculation result. The second subtraction processing unit may output the second SAD calculation result obtained by subtracting the second subtraction SAD calculation result from the extended SAD calculation result.

According to a fourth aspect of the present invention, in the image processing device according to the first aspect of the present invention, combinations, each of which includes the extended region SAD calculation unit and the subtraction processing units equal in number to the target pixels, may be provided to be equal in number to types of weight values set in pixels within the extended target region. The image processing device may further include: weight processing units equal in number to the target pixels adjacent to each other to be simultaneously correlated, the weight processing units being configured to output weighted SAD calculation results obtained by performing weighting processes on the SAD calculation results output from the subtraction processing units.

According to a fifth aspect of the present invention, in the image processing device according to the fourth aspect of the present invention, each of the combinations of the extended region SAD calculation unit and the subtraction processing units equal in number to the target pixels may output each of the SAD calculation results corresponding to corresponding weight values. Each of the weight processing units may output each of the weighted SAD calculation results obtained by multiplying each of the SAD calculation results in the corresponding target pixels output from each of the combinations of the extended region SAD calculation unit and the subtraction processing units equal in number to the target pixels by each of values based on the corresponding weight values and then adding each of the multiplied SAD calculation results corresponding to the weight values.

According to a sixth aspect of the present invention, in the image processing device according to the fifth aspect of the present invention, the first extended region SAD calculation unit, which is one of the extended region SAD calculation units corresponding to a first weight value, may define each of an extended target region of a first weight which is the extended target region obtained by combining a first target region of the first weight in which the first weight value is set in a first target region having a predetermined size including peripheral pixels to be correlated around a first target pixel which has been input and a second target region of the first weight in which the first weight value is set in a second target region having a predetermined size including peripheral pixels to be simultaneously correlated around a second target pixel which has been simultaneously input and an extended reference region of the first weight which is the extended reference region obtained by combining a first reference region of the first weight in which the first weight value is set in a first reference region having a predetermined size corresponding to the first target region around a first reference pixel corresponding to the first target pixel and a second reference region of the first weight in which the first weight value is set in a second reference region having a predetermined size corresponding to the second target region around a second reference pixel corresponding to the second target pixel, calculate difference absolute values between values represented by pixel signals of pixels positioned in the same coordinates in the extended target region of the first weight and the extended reference region of the first weight, and output an extended SAD calculation result of the first weight which is the extended SAD calculation result obtained by performing the SAD calculation of integrating the calculated difference absolute values. A first subtraction processing unit of the first weight, which is one of the subtraction processing units corresponding to the first weight value and corresponding to the first target pixel, may output a first SAD calculation result of the first weight obtained by subtracting the SAD calculation result corresponding to a region of a pixel which is not included in the first target region of the first weight within the extended target region of the first weight from the extended SAD calculation result of the first weight. A second subtraction processing unit of the first weight, which is another of the subtraction processing units corresponding to the first weight value and corresponding to the second target pixel, may output a second SAD calculation result of the first weight obtained by subtracting the SAD calculation result corresponding to a region of a pixel which is not included in the second target region of the first weight within the extended target region of the first weight from the extended SAD calculation result of the first weight. A second extended region SAD calculation unit, which is another of the extended region SAD calculation units corresponding to a second weight value which is less than the first weight value and set in a pixel of a region greater than a region of a pixel in which the first weight value is set, may define each of an extended target region of a second weight which is the extended target region obtained by combining a first target region of the second weight in which the second weight value is set in the first target region and a second target region of the second weight in which the second weight value is set in the second target region and an extended reference region of the second weight which is the extended reference region obtained by combining a first reference region of the second weight in which the second weight value is set in the first reference region and a second reference region of the second weight in which the second weight value is set in the second reference region, calculate difference absolute values between values represented by pixel signals of pixels positioned in the same coordinates in the extended target region of the second weight and the extended reference region of the second weight, and output an extended SAD calculation result of the second weight which is the extended SAD calculation result obtained by performing the SAD calculation of integrating the calculated difference absolute values. A first subtraction processing unit of the second weight, which is another of the subtraction processing units corresponding to the second weight value and corresponding to the first target pixel, may output a first SAD calculation result of the second weight obtained by subtracting the SAD calculation result corresponding to a region of a pixel which is not included in the first target region of the second weight within the extended target region of the second weight from the extended SAD calculation result of the second weight. A second subtraction processing unit of the second weight, which is another of the subtraction processing units corresponding to the second weight value and corresponding to the second target pixel, may output a second SAD calculation result of the second weight obtained by subtracting the SAD calculation result corresponding to a region of a pixel which is not included in the second target region of the second weight within the extended target region of the second weight from the extended SAD calculation result of the second weight. The first weight processing unit, which is one of the weight processing units corresponding to the first target pixel, may multiply the first SAD calculation result of the first weight by a weight value obtained by subtracting the second weight value from the first weight value, multiply the first SAD calculation result of the second weight by the second weight value, and output a first weighted SAD calculation result which is the weighted SAD calculation result obtained by adding the first SAD calculation result of the first weight multiplied by the weight value and the first SAD calculation result of the second weight multiplied by the second weight value. The second weight processing unit, which is another of the weight processing units corresponding to the second target pixel, may multiply the second SAD calculation result of the first weight by a weight value obtained by subtracting the second weight value from the first weight value, multiply the second SAD calculation result of the second weight by the second weight value, and output a second weighted SAD calculation result which is the weighted SAD calculation result obtained by adding the second SAD calculation result of the first weight multiplied by the weight value and the second SAD calculation result multiplied of the second weight by the second weight value.

According to a seventh aspect of the present invention, an image processing method for use in an image processing device, to which pixel signals of a plurality of adjacent pixels are simultaneously input, configured to simultaneously find correlations between a plurality of target pixels adjacent to each other and corresponding reference pixels with pixels around the plurality of target pixels for each of the plurality of target pixels, includes: an extended region SAD calculation procedure of defining each of an extended target region obtained by combining a plurality of target regions predetermined for each of the plurality of target pixels adjacent to each other to be simultaneously correlated and an extended reference region corresponding to the extended target region obtained by combining a plurality of reference regions predetermined for each of reference pixels corresponding to the plurality of target pixels, and outputting an extended SAD calculation result obtained by performing SAD calculation based on values represented by pixel signals of pixels included in the defined extended target region and the defined extended reference region; and subtraction processing procedures, which correspond to the plurality of target pixels, of outputting SAD calculation results obtained by subtraction processes based on the extended SAD calculation result and an SAD calculation result corresponding to a region of a peripheral pixel which is not included in a predetermined target region for the plurality of target pixels to which the subtraction processing procedures correspond, wherein the subtraction processing procedures are equal in number to the target pixels adjacent to each other to be simultaneously correlated.

According to an eighth aspect of the present invention, an imaging device includes: a solid-state imaging device having a plurality of pixels and configured to simultaneously output a plurality of pixel signals obtained by photoelectrically converting signals of the plurality of pixels adjacent to each other; and the image processing device according to any one of the first to sixth aspect of the present invention, to which the plurality of pixel signals of the plurality of pixels adjacent to each other are input from the solid-state imaging device, configured to simultaneously find correlations between the plurality of target pixels and the corresponding reference pixels with the pixels around the plurality of target pixels for each of the plurality of target pixels.

BRIEF DESCRIPTION OF THE DRAWINGS

FIG. 1 is a block diagram illustrating a schematic configuration of an image processing device according to a first embodiment of the present invention.

FIG. 2A is a diagram schematically illustrating an example of a region of pixels on which SAD calculations are simultaneously performed in the image processing device according to the first embodiment.

FIG. 2B is a diagram schematically illustrating an example of a region of pixels on which the SAD calculations are simultaneously performed in the image processing device according to the first embodiment.

FIG. 3 is a diagram schematically illustrating an SAD calculation method in the image processing device according to the first embodiment.

FIG. 4A is a diagram schematically illustrating another example of a region of pixels on which the SAD calculations are simultaneously performed and a calculation method in the image processing device according to the first embodiment.

FIG. 4B is a diagram schematically illustrating another example of a region of pixels on which the SAD calculations are simultaneously performed and a calculation method in the image processing device according to the first embodiment.

FIG. 4C is a diagram schematically illustrating another example of a region of pixels on which the SAD calculations are simultaneously performed and a calculation method in the image processing device according to the first embodiment.

FIG. 5A is a diagram schematically illustrating another example of the SAD calculation method in the image processing device according to an embodiment of the present invention.

FIG. 5B is a diagram schematically illustrating another example of the SAD calculation method in the image processing device according to an embodiment of the present invention.

FIG. 11A is a diagram schematically illustrating another example of a region of pixels on which SAD calculations are simultaneously performed in the image processing device according to the second embodiment.

FIG. 11B is a diagram schematically illustrating another example of a region of pixels on which the SAD calculations are simultaneously performed in the image processing device according to the second embodiment.

FIG. 12A is a diagram schematically illustrating an example of pixels on which the SAD calculations are performed and a region of the pixels on which the SAD calculations are performed.

FIG. 12B is a diagram schematically illustrating an example of pixels on which the SAD calculations are performed and a region of the pixels on which the SAD calculations are performed.

DETAILED DESCRIPTION OF THE INVENTION

First Embodiment

Figure 6:
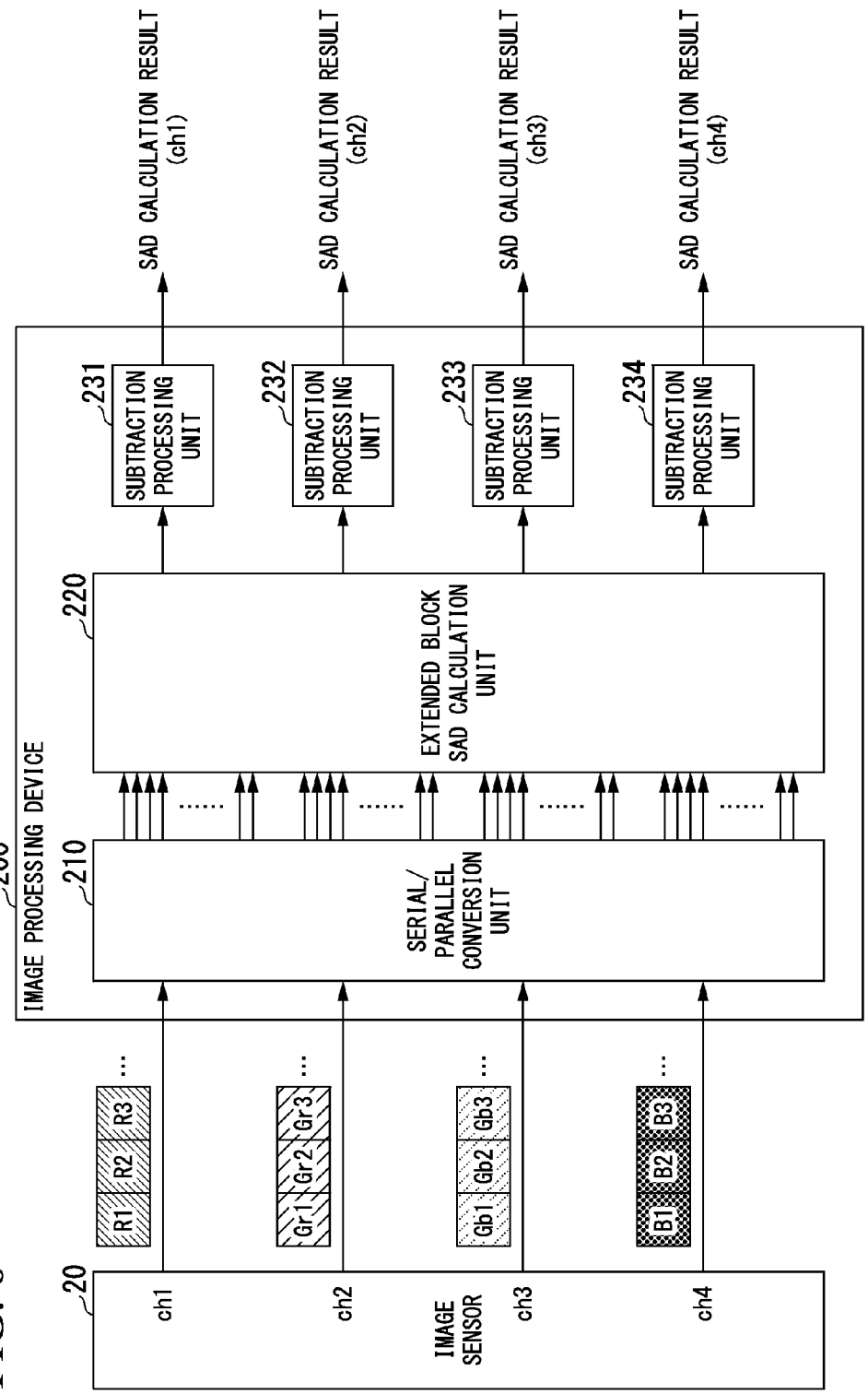
FIG. 6 is a block diagram illustrating a schematic configuration of the image processing device when pixel signals of four channels are simultaneously input in the image processing device according to the embodiment of the present invention.

Hereinafter, the embodiment of the present invention will be described with reference to the drawings. FIG. 1 is a block diagram illustrating a schematic configuration of an image processing device according to the first embodiment. An image processing device 100 illustrated in FIG. 1 includes a serial/parallel conversion unit 110, an extended block SAD calculation unit 120, two subtraction processing units 131 and 132. In addition, in FIG. 1, a solid-state imaging device (hereinafter referred to as an "image sensor") 10 mounted on the imaging device and configured to output a pixel signal to the image processing device 100 is also illustrated. However, in FIG. 1, a component for converting a pixel signal (analog signal) output from each pixel arranged in the image sensor 10 into a digital signal is omitted. In addition, in FIG. 1, an output signal line from the serial/parallel conversion unit 110 to the extended block SAD calculation unit 120 is simplified and illustrated.

The image sensor 10 is a solid-state imaging device represented by a charge coupled device (CCD) image sensor or a complementary metal-oxide semiconductor (CMOS) image sensor configured to photoelectrically convert an optical image of a subject formed by a lens (not illustrated). The image sensor 10 outputs pixel signals of an image captured through imaging, that is, pixel signals of pixels corresponding to incident subject light, from two pixels adjacent in the horizontal direction x from two channels corresponding to the pixels. Also, in the following description, the image sensor 10 will be described as a solid-state imaging device in which color filters of a Bayer arrangement are attached to an imaging surface and the pixel signals of the two pixels adjacent in the horizontal direction x of the captured image of the Bayer arrangement will be described as pixel signals to be output simultaneously from corresponding channels.

When the image sensor 10 of the Bayer arrangement simultaneously outputs pixel signals of two pixels adjacent in the horizontal direction x, a pixel signal of an R pixel is first sequentially output from one channel (hereinafter referred to as a "channel ch1") at an initial output timing and simultaneously a pixel signal of a Gr pixel adjacent to the R pixel in the horizontal direction (row direction) is sequentially output from the other channel (hereinafter referred to as a "channel ch2"). Thereafter, the image sensor 10 sequentially outputs a pixel signal of a Gb pixel from one channel at the next output timing and simultaneously a pixel signal of a B pixel adjacent to the Gb pixel in the horizontal direction (row direction) is sequentially output from the other channel.

In this manner, the image sensor 10 alternately iterates an output of the pixel signals of the two pixels adjacent in the vertical direction (column direction) for every row. Then, a pixel signal output by the image sensor 10 from each channel is converted into a digital signal by a component (for example, an analog-to-digital conversion circuit) (not illustrated) and the digital signal is sequentially input to the image processing device 100 as image data corresponding to a pixel value represented by the pixel signal output from each channel.

Also, in the following description, for ease of the description, the image sensor 10 will be described as that configured to output image data corresponding to the pixel signal from each channel. In FIG. 1, a state in which image data (R1, R2, R3, ...) corresponding to pixel signals of R pixels from the channel ch1 of the image sensor 10 and image data (Gr1, Gr2, Gr3, ...) corresponding to pixel signals of Gr pixels from the channel ch2 are simultaneously sequentially input to the image processing device 100 is illustrated.

The image processing device 100 is provided within an image processing unit configured to perform various image processing on a digital signal corresponding to a pixel signal output from each pixel arranged in the image sensor 10. Also, in FIG. 1, only the configuration of the image processing device 100 according to the first embodiment configured to perform image processing of finding a correlation between a target pixel and a reference pixel based on a digital signal (image data) corresponding to a pixel value represented by each pixel signal output from the image sensor 10 is illustrated. In the image processing device 100 according to the first embodiment, as a technique of finding the correlation between the target pixel and the reference pixel, SAD calculation for obtaining an SAD of image data corresponding to each image within a region having a predetermined size around a target pixel output from the image sensor 10 is performed and a result of performing SAD calculation (hereinafter referred to as an "SAD calculation result") is output. Also, the image processing device 100 illustrated in FIG. 1 is an example of a configuration corresponding to the image sensor 10 of the Bayer arrangement configured to simultaneously output pixel signals of two pixels adjacent in the horizontal direction (row direction) x.

The serial/parallel conversion unit 110 simultaneously (in parallel) outputs image data, which is sequentially (in series) input from channels of the image sensor 10, equal in number to the number of pieces to be used when the extended block SAD calculation unit 120 of the subsequent stage performs SAD calculation. More specifically, the serial/parallel conversion unit 110 temporarily stores the image data alternately input for every row of the image sensor 10, and simultaneously outputs the stored image data equal in number to the number of times that the extended block SAD calculation unit 120 performs SAD calculation. The serial/parallel conversion unit 110, for example, includes line memories equal in number to the number of pieces of image data of the vertical direction (column direction) of the image sensor 10 to be used when the image processing device 100 performs SAD calculation, that is, the number of rows (the number of lines) of the horizontal direction of the image sensor 10.

Through this configuration, even when the image data has been input at different timings, the serial/parallel conversion unit 110 can output the image data included in the block on which the SAD calculation is performed to the extended block SAD calculation unit 120 at the same timing.

The extended block SAD calculation unit 120 performs SAD calculations based on the image data simultaneously input from the serial/parallel conversion unit 110, and outputs SAD calculation results after the SAD calculations to the subtraction processing units of the subsequent stage corresponding to channels of the image sensor 10.

In the SAD calculation by the extended block SAD calculation unit 120, each of a region having a predetermined size around the target pixel output from the channel ch1 of the image sensor 10 (hereinafter referred to as a "first target block") and a region having a predetermined size around the target pixel output from the channel ch2 (hereinafter referred to as a "second target block") is first defined. Then, the extended block SAD calculation unit 120 further defines a region obtained by combining the first target block and the second target block (hereinafter referred to as an "extended target block").

In addition, in the SAD calculation by the extended block SAD calculation unit 120, each of a region having a predetermined size around a reference pixel corresponding to the target pixel output from the channel ch1 of the image sensor 10 (hereinafter referred to as a "first reference block") and a region having a predetermined size around the reference pixel corresponding to the target pixel output from the channel ch2 (hereinafter referred to as a "second reference block") is defined. Then, the extended block SAD calculation unit 120 further defines a region obtained by combining the first reference block and the second reference block (hereinafter referred to as an "extended reference block").

Also, the image sensor 10 simultaneously outputs image data of two pixels adjacent in the horizontal direction x. Because of this, the first and second target blocks defined by the extended block SAD calculation unit 120 are regions shifted by one pixel in the horizontal direction x. In addition, likewise, the first and second reference blocks defined by the extended block SAD calculation unit 120 are also regions shifted by one pixel in the horizontal direction x.

Here, in the following description, in order for a position of each pixel corresponding to image data output from the image sensor 10 to be easily identified, a coordinate value of the pixel is represented by XY coordinates, and a column number of the horizontal direction x of the pixel in the beginning within "( ): brackets" and a row number of the vertical direction y in the end are represented by numbers. For example, the target pixel positioned at the coordinate position of the horizontal direction x=6 and the vertical direction y=6 output from the channel ch1 of the image sensor 10 is represented by a target pixel (6, 6) and the target pixel positioned at the coordinate position of the horizontal direction x=7 and the vertical direction y=6 output from the channel ch2 of the image sensor 10 is represented by a target pixel (7, 6).

Thereafter, the extended block SAD calculation unit 120 calculates the difference absolute value between the image data of pixels positioned in the same coordinates in the defined extended target block and extended reference block, and outputs a result of integrating the calculated difference absolute value, that is, an SAD calculation result corresponding to the extended target block (hereinafter referred to as an "extended SAD calculation result"), to each of the subtraction processing units 131 and 132 of the subsequent stage. At this time, the extended SAD calculation result output by the extended block SAD calculation unit 120 is represented by the following Equation (2).

$$SADe(x, y) = \sum_{-h \leq i \leq h+1, -v \leq j \leq v} |A(x+i, y+j) - B(x+i-n, y+j-m)| \quad (2)$$

In the above Equation (2), SADe(x, y) represents an extended SAD calculation result corresponding to the extended target block around the target pixel (x, y) output from the channel ch1 of the image sensor 10 positioned in the coordinate position of the horizontal direction x and the vertical direction y. In addition, in the above Equation (2), A(x, y) represents image data within the extended target block around the target pixel (x, y) positioned in a coordinate position of the horizontal direction x and the vertical direction y, and B(x, y) represents image data within an extended reference block corresponding to image data within the extended target block around the target pixel (x, y) positioned in the coordinate position of the horizontal direction x and the vertical direction y. In addition, in the above Equation (2), h represents the number of pixels representing a size of the horizontal direction of the region of the extended target block around the target pixel (x, y), and v represents the number of pixels representing a size of the vertical direction of the region of the extended target block around the target pixel (x, y). In addition, in the above Equation (2), n represents the number of pixels representing a distance of the horizontal direction from the target pixel (x, y) of the reference pixel corresponding to the target pixel (x, y) within the extended target block, and m represents the number of pixels representing a distance of the vertical direction from the target pixel (x, y) of the reference pixel corresponding to the target pixel (x, y) within the extended target block. Accordingly, in the above Equation (2), h, v, n, m, and j are positive integers.

In addition, the extended block SAD calculation unit 120 outputs the SAD calculation result corresponding to a block which is not included in the first target block (hereinafter referred to as a "first subtraction block") within the defined extended target block (hereinafter referred to as a "first subtraction SAD calculation result") to the subtraction processing unit 131. In addition, the extended block SAD calculation unit 120 outputs the SAD calculation result corresponding to a block which is not included in the second target block (hereinafter referred to as a "second subtraction block") within the defined extended target block (hereinafter referred to as a "second subtraction SAD calculation result") to the subtraction processing unit 132.

Also, the extended block SAD calculation unit 120 includes calculation circuits equal in number to the number of pixels included in the extended target block and configured to calculate a difference absolute value between image data of pixels positioned in the same coordinates in the extended target block and the extended reference block. For example, when the corresponding region of each of the first and second target blocks is a region of 5 pixels×5 pixels in the extended block SAD calculation unit 120, a region of the extended target block obtained by combining the first and second target blocks becomes a region of 6 pixels×5 pixels. Because of this, the extended block SAD calculation unit 120 includes calculation circuits for 6 pixels×5 pixels, that is, 30 calculation circuits. Thereby, the extended block SAD calculation unit 120 can simultaneously output an extended SAD calculation result, a first subtraction SAD calculation result, and a second subtraction SAD calculation result, which are obtained by performing SAD calculation based on image data simultaneously input from the serial/parallel conversion unit 110, to each of the subtraction processing units 131 and 132.

Each of the subtraction processing units 131 and 132 outputs the SAD calculation result corresponding to each channel of the image sensor 10 based on the extended SAD calculation result input from the extended block SAD calculation unit 120 and the first subtraction SAD calculation result input from the extended block SAD calculation unit 120 or the second subtraction SAD calculation result input from the extended block SAD calculation unit 120. Also, in the image processing device 100 illustrated in FIG. 1, the subtraction processing unit 131 corresponds to the channel ch1 of the image sensor 10 and the subtraction processing unit 132 corresponds to the channel ch2 of the image sensor 10.

More specifically, the subtraction processing unit 131 subtracts the first subtraction SAD calculation result input from the extended block SAD calculation unit 120 from the extended SAD calculation result input from the extended block SAD calculation unit 120, and outputs a subtraction result as the SAD calculation result corresponding to the channel ch1 of the image sensor 10. At this time, the SAD calculation result corresponding to the first target block output by the subtraction processing unit 131 is represented by the following Equation (3).

$$SAD1(x, y) = \hspace{4cm} (3)$$
$$SADe(x, y) - \sum_{i=h+1, -v \leq j \leq v} |A(x+i, y+j) - B(x+i-n, y+j-m)|$$

In the above Equation (3), SAD1(x, y) represents an SAD calculation result corresponding to the first target block around the target pixel (x, y) output from the channel ch1 of the image sensor 10 positioned in the coordinate position of the horizontal direction x and the vertical direction y. In addition, in the above Equation (3), the second term of the right side is an expression representing the first subtraction SAD calculation result corresponding to the first subtraction block. In addition, A(x, y), B(x, y), h, v, n, m, i, and j in the above Equation (3) are similar to those of the above Equation (2).

In addition, the subtraction processing unit 132 subtracts the second subtraction SAD calculation result input from the extended block SAD calculation unit 120 from the extended SAD calculation result input from the extended block SAD calculation unit 120, and outputs a subtraction result as the SAD calculation result corresponding to the channel ch2 of the image sensor 10. At this time, the SAD calculation result corresponding to the second target block output by the subtraction processing unit 132 is represented by the following Equation (4).

$$SAD2(x, y) = \hspace{4cm} (4)$$
$$SADe(x, y) - \sum_{i=-h, -v \leq j \leq v} |A(x+i, y+j) - B(x+i-n, y+j-m)|$$

In the above Equation (4), SAD2(x, y) represents an SAD calculation result corresponding to the second target block around the target pixel (x, y) output from the channel ch2 of the image sensor 10 positioned in the coordinate position of the horizontal direction x and the vertical direction y. In addition, in the above Equation (4), the second term of the right side is an expression representing the second subtraction SAD calculation result corresponding to the second subtraction block. In addition, A(x, y), B(x, y), h, v, n, m, i, and j in the above Equation (4) are similar to those of the above Equations (2) and (3).

Through this configuration, the image processing device 100 simultaneously outputs the SAD calculation result corresponding to the channel ch1 of the image sensor 10 and the SAD calculation result corresponding to the channel ch2 of the image sensor 10. That is, the image processing device 100 outputs the SAD calculation result corresponding to the channel ch1 of the image sensor 10 through the configurations of the extended block SAD calculation unit 120 and the subtraction processing unit 131, and outputs the SAD calculation result corresponding to the channel ch2 of the image sensor 10 through the configurations of the extended block SAD calculation unit 120 and the subtraction processing unit 132.

Next, a method of performing the SAD calculation corresponding to each channel of the image sensor 10 in the image processing device 100 according to the first embodiment will be described. First, a region in which SAD calculations are simultaneously performed will be described using FIGS. 2A and 2B. Each of FIGS. 2A and 2B is a diagram schematically illustrating an example of a region of pixels on which the SAD calculations are simultaneously performed in the image processing device 100 according to the first embodiment. A positional relationship between the first target block around the target pixel output from the channel ch1 of the image sensor 10 and the first reference block is illustrated in FIG. 2A, and a positional relationship between the second target block around the target pixel output from the channel ch2 of the image sensor 10 and the second reference block is illustrated in FIG. 2B.

As seen from FIGS. 2A and 2B, when the image sensor 10 simultaneously outputs image data of two pixels adjacent in the horizontal direction x, a target pixel output from the channel ch1 of the image sensor 10 and a target pixel output from the channel ch2 of the image sensor 10 are two pixels adjacent in the horizontal direction x. Likewise, a reference pixel corresponding to the target pixel output from the channel ch1 of the image sensor 10 and a reference pixel corresponding to the target pixel output from the channel ch2 of the image sensor 10 are also two pixels adjacent in the horizontal direction x.

More specifically, in the examples illustrated in FIGS. 2A and 2B, the coordinate position of the target pixel output from the channel ch1 of the image sensor 10 is a coordinate position of the horizontal direction x=6 and the vertical direction y=6, and the coordinate position of the target pixel output from the channel ch2 of the image sensor 10 is a coordinate position of the horizontal direction x=7 and the vertical direction y=6. Likewise, as the coordinate position shifted by −4 in the horizontal direction and −4 in the vertical direction from the coordinate position of each target pixel, the coordinate position of the reference pixel corresponding to the target pixel output from the channel ch1 of the image sensor 10 is a coordinate position of the horizontal direction x=2 and the vertical direction y=2, and the coordinate position of the reference pixel corresponding to the target pixel output from the channel ch2 of the image sensor 10 is a coordinate position of the horizontal direction x=3 and the vertical direction y=2.

As described above, the extended block SAD calculation unit 120 defines each of a first target block around a target pixel (6, 6) output from the channel ch1 of the image sensor 10 and a second target block around a target pixel (7, 6) output from the channel ch2. In addition, the extended block SAD calculation unit 120 defines each of a first reference block around a reference pixel (2, 2) corresponding to the target pixel (6, 6) output from the channel ch1 of the image sensor 10 and a second reference block around a reference pixel (3, 2) corresponding to the target pixel (7, 6) output from the channel ch2.

More specifically, in the example illustrated in FIGS. 2A and 2B, the extended block SAD calculation unit 120 defines a region of 5 pixels×5 pixels around the target pixel (6, 6) output from the channel ch1 of the image sensor 10 as a first target block, and defines a region of 5 pixels×5 pixels around the target pixel (7, 6) output from the channel ch2 of the image sensor 10 as a second target block. In addition, the extended block SAD calculation unit 120 defines a region of 5 pixels×5 pixels around the reference pixel (2, 2) corresponding to the target pixel (6, 6) output from the channel ch1 of the image sensor 10 as a first reference block, and defines a region of 5 pixels×5 pixels around the reference pixel (3, 2) corresponding to the target pixel (7, 6) output from the channel ch2 as a second reference block.

An SAD calculation result obtained by performing SAD calculation based on image data within the first target block and image data within the first reference block defined here is a final SAD calculation result corresponding to the target pixel (6, 6) output from the channel ch1 of the image sensor 10. In addition, an SAD calculation result obtained by performing SAD calculation based on image data within the second target block and image data within the second reference block defined here is a final SAD calculation result corresponding to the target pixel (7, 6) output from the channel ch2 of the image sensor 10.

Also, in the image processing unit provided in the conventional imaging device, the SAD calculation results corresponding to the first target block and the second target block are simultaneously output by providing an SAD calculation unit configured to perform the SAD calculation based on the image data within the first target block and the image data within the first reference block and an SAD calculation unit configured to perform the SAD calculation based on the image data within the second target block and the image data within the second reference block.

On the other hand, in the image processing device 100 according to the first embodiment, the extended block SAD calculation unit 120 defines each of the extended target block obtained by combining the first and second target blocks and the extended reference block obtained by combining the first and second reference blocks. FIG. 3 is a diagram schematically illustrating an SAD calculation method in the image processing device 100 according to the first embodiment. In FIG. 3, a state in which each of an extended target block of a region of 6 pixels×5 pixels obtained by combining the first and second target blocks and an extended reference block of a region of 6 pixels×5 pixels obtained by combining the first and second reference blocks is defined is illustrated.

As seen from FIG. 3, the target pixel (6, 6) output from the channel ch1 of the image sensor 10 and the target pixel (7, 6) output from the channel ch2 of the image sensor 10 are included within the extended target block. In addition, the reference pixel (2, 2) corresponding to the target pixel (6, 6) output from the channel ch1 of the image sensor 10 and the reference pixel (3, 2) corresponding to the target pixel (7, 6) output from the channel ch2 of the image sensor 10 are included within the extended reference block.

Then, in the image processing device 100 according to the first embodiment, the extended block SAD calculation unit 120 performs SAD calculation based on image data within the defined extended target block and image data within the defined extended reference block, and outputs the extended SAD calculation result corresponding to the extended target block to each of the subtraction processing units 131 and 132. At this time, the extended SAD calculation result corresponding to the extended target block around the target pixel (6, 6) output from the channel ch1 of the image sensor 10 illustrated in FIG. 3 output by the extended block SAD calculation unit 120 is represented by the following Equation (5) based on the above Equation (2).

$$SADe(6,6) = \sum_{-2 \le i \le 3, -2 \le j \le 2} |A(6+i, 6+j) - B(6+i-4, 6+j-4)| \quad (5)$$

$$\sum_{-2 \le i \le 3, -2 \le j \le 2} |A(6+i, 6+j) - B(2+i, 2+j)|$$

Further, in the image processing device 100 according to the first embodiment, the extended block SAD calculation unit 120 outputs the first subtraction SAD calculation result obtained by performing the SAD calculation based on image data within a block which is not included in the first target block, that is, a first subtraction block illustrated in FIG. 3, within the defined extended target block and image data of a region within the extended reference block corresponding to the first subtraction block to the subtraction processing unit 131.

Thereby, the subtraction processing unit 131 obtains the SAD calculation result corresponding to the first target block by subtracting the first subtraction SAD calculation result from the extended SAD calculation result input from the extended block SAD calculation unit 120. Then, the subtraction processing unit 131 outputs the SAD calculation result corresponding to the first target block as the SAD calculation result corresponding to the channel ch1 of the image sensor 10. At this time, the SAD calculation result corresponding to the first target block around the target pixel (6, 6) output from the channel ch1 of the image sensor 10 illustrated in FIG. 2A output by the subtraction processing unit 131 is represented by the following Equation (6) based on the above Equation (3).

$$SAD1(6,6) = SADe(6,6) - \sum_{i=3, -2 \le j \le 2} |A(6+i, 6+j) - B(6+i-4, 6+j-4)| \quad (6)$$

$$= SADe(6,6) - \sum_{i=3, -2 \le j \le 2} |A(6+i, 6+j) - B(2+i, 2+j)|$$

In addition, in the image processing device 100 according to the first embodiment, the extended block SAD calculation unit 120 outputs the second subtraction SAD calculation result obtained by performing the SAD calculation based on image data within a block which is not included in the second target block, that is, a second subtraction block illustrated in FIG. 3, within the defined extended target block and image data of a region within the extended reference block corresponding to the second subtraction block to the subtraction processing unit 132.

Thereby, the subtraction processing unit 132 obtains the SAD calculation result corresponding to the second target block by subtracting the second subtraction SAD calculation result from the extended SAD calculation result input from the extended block SAD calculation unit 120. Then, the subtraction processing unit 132 outputs the SAD calculation result corresponding to the second target block as the SAD calculation result corresponding to the channel ch2 of the image sensor 10. At this time, the SAD calculation result corresponding to the second target block around the target pixel (7, 6) output from the channel ch2 of the image sensor 10 illustrated in FIG. 2B output by the subtraction processing unit 132 is represented by the following Equation (7) based on the above Equation (4).

$$SAD2(7,6) = SADe(7,6) - \sum_{i=-2, -2 \le j \le 2} |A(7+i, 6+j) - B(7+i-4, 6+j-4)| \quad (7)$$

$$= SADe(7,6) - \sum_{i=-2, -2 \le j \le 2} |A(7+i, 6+j) - B(3+i, 2+j)|$$

According to the first embodiment, an image processing device (image processing device 100), to which pixel signals of a plurality of adjacent pixels are simultaneously input, configured to simultaneously find correlations between a plurality of target pixels adjacent to each other and corresponding reference pixels with pixels around the plurality of target pixels for each of the plurality of target pixels includes: an extended region SAD calculation unit (extended block SAD calculation unit 120) configured to define each of an extended target region (extended target block) obtained by combining a plurality of target regions (first and second target blocks) predetermined for each of the plurality of target pixels adjacent to each other to be simultaneously correlated and an extended reference region (extended reference block) corresponding to the extended target block obtained by combining a plurality of reference regions (first and second reference blocks) predetermined for each of reference pixels corresponding to the plurality of target pixels, and output an extended SAD calculation result obtained by performing SAD calculation based on values represented by pixel signals of pixels included in the defined extended target block and the defined extended reference block; and (two) subtraction processing units (subtraction processing units 131 and 132) equal in number to the target pixels adjacent to each other to be simultaneously correlated and configured to correspond to the plurality of target pixels and output SAD calculation results obtained by performing subtraction processes based on the extended SAD calculation result and an SAD calculation result (first or second subtraction SAD calculation result) corresponding to a region (first or second subtraction block) of a peripheral pixel which is not included in the first or second target block predetermined for the corresponding target pixels.

In addition, according to the first embodiment, an image processing method for use in an image processing device (image processing device 100), to which pixel signals of a plurality of adjacent pixels are simultaneously input, configured to simultaneously find correlations between a plurality of target pixels adjacent to each other and corresponding reference pixels with pixels around the plurality of target pixels for each of the plurality of target pixels includes: an extended region SAD calculation procedure (an operation procedure in the extended block SAD calculation unit 120) of defining each of an extended target region (extended target block) obtained by combining a plurality of target regions (first and second target blocks) predetermined for each of the plurality of target pixels adjacent to each other to be simultaneously correlated and an extended reference region (extended reference block) corresponding to the extended target block obtained by combining a plurality of reference regions (first and second reference blocks) predetermined for each of reference pixels corresponding to the plurality of target pixels, and outputting an extended SAD calculation result obtained by performing SAD calculation based on values represented by pixel signals of pixels included in the defined extended target block and the defined extended reference block; and (two) subtraction processing procedures (operation procedures in the subtraction processing units 131 and 132) of outputting SAD calculation results obtained by performing subtraction processes based on the extended SAD calculation result and an SAD calculation result (first or second subtraction SAD calculation result) corresponding to a region (first or second subtraction block) of a peripheral pixel which is not included in the first target block or the second target block predetermined for the corresponding target pixels, wherein the subtraction processing procedures correspond to the plurality of target pixels and are equal in number to the target pixels adjacent to each other to be simultaneously correlated.

In addition, according to the first embodiment, an imaging device includes: a solid-state imaging device (image sensor 10) having a plurality of pixels and configured to simultaneously output a plurality of pixel signals obtained by photoelectrically converting signals of a plurality of adjacent pixels; and the image processing device (image processing device 100), to which the pixel signals of the plurality of adjacent pixels are simultaneously input from the image sensor 10, configured to simultaneously find correlations between a plurality of target pixels adjacent to each other and corresponding reference pixels with pixels around the plurality of target pixels for each of the plurality of target pixels.

In addition, according to the first embodiment, in the image processing device 100, the extended block SAD calculation unit 120 defines each of the extended target block obtained by combining a first target region (first target block) having a predetermined size including peripheral pixels to be correlated around a first target pixel (the target pixel (6, 6) output from the channel ch1 of the image sensor 10) which has been input and a second target region (second target block) having a predetermined size including peripheral pixels to be simultaneously correlated around an adjacent second target pixel (the target pixel (7, 6) output from the channel ch2 of the image sensor 10) which has been simultaneously input and the extended reference block obtained by combining a first reference region (first reference block) having a predetermined size corresponding to the first target block around a first reference pixel (the reference pixel (2, 2) output from the channel ch1 of the image sensor 10) corresponding to the target pixel (6, 6) and a second reference region (second reference block) having a predetermined size corresponding to the second target block around a second reference pixel (the reference pixel (3, 2) output from the channel ch2 of the image sensor 10) corresponding to the target pixel (7, 6), calculates difference absolute values between values (image data) represented by pixel signals of pixels positioned in the same coordinates in the extended target region and the extended reference region, and outputs the extended SAD calculation result obtained by performing the SAD calculation of integrating the calculated difference absolute values. A first subtraction processing unit (subtraction processing unit 131), which is the subtraction processing unit corresponding to the target pixel (6, 6), outputs a first SAD calculation result (an SAD calculation result corresponding to the channel ch1 of the image sensor 10) obtained by subtracting an SAD calculation result (first subtraction SAD calculation result) corresponding to a region (first subtraction block) of a pixel which is not included in the first target block within the extended target block from the extended SAD calculation result. A second subtraction processing unit (subtraction processing unit 132), which is the subtraction processing unit corresponding to the target pixel (7, 6), outputs a second SAD calculation result (an SAD calculation result corresponding to the channel ch2 of the image sensor 10) obtained by subtracting an SAD calculation result (second subtraction SAD calculation result) corresponding to a region (second subtraction block) of a pixel which is not included in the second target block within the extended target block from the extended SAD calculation result.

In addition, according to the first embodiment, in the image processing device 100, the extended block SAD calculation unit 120 outputs each of the first subtraction SAD calculation result obtained by performing the SAD calculation based on values represented by pixel signals of pixels positioned in the same coordinates in the first subtraction block of pixels within the extended target block which is not included in the first target block and a region of pixels within the extended reference block which is not included in the first reference block corresponding to the first subtraction block and the second subtraction SAD calculation result obtained by performing the SAD calculation based on values represented by pixel signals of pixels positioned in the same coordinates in the second subtraction block of pixels within the extended target block which is not included in the second target block and a region of pixels within the extended reference block which is not included in the second reference block corresponding to the second subtraction block. The subtraction processing unit 131 outputs the first SAD calculation result (the SAD calculation result corresponding to the channel ch1 of the image sensor 10) obtained by subtracting the first subtraction SAD calculation result from the extended SAD calculation result, and the subtraction processing unit 132 outputs the second SAD calculation result (the SAD calculation result corresponding to the channel ch2 of the image sensor 10) obtained by subtracting the second subtraction SAD calculation result from the extended SAD calculation result.

As described above, in the image processing device 100 according to the first embodiment, the SAD calculation is performed on the extended target block obtained by combining the first target block around the target pixel output from the channel ch1 of the image sensor 10 and the second target block around the target pixel output from the channel ch2 of the image sensor 10. Then, in the image processing device 100 according to the first embodiment, the first subtraction SAD calculation result corresponding to the first subtraction block which is not included in the first target block or the second subtraction SAD calculation result corresponding to the second subtraction block which is not included in the second target block is subtracted from the extended SAD calculation result corresponding to the extended target block. Thereby, even in the image processing device 100 according to the first embodiment, it is possible to obtain the same SAD calculation result as that of the image processing unit provided in the conventional imaging device configured to simultaneously perform the SAD calculation corresponding to the first target block and the SAD calculation corresponding to the second target block.

Furthermore, in the image processing device 100 according to the first embodiment, the SAD calculation performed by an individual SAD calculation unit corresponding to each of the first and second target blocks in the image processing unit provided in the conventional imaging device can be performed by a combination of the extended block SAD calculation unit 120 and the subtraction processing unit 131 or 132. Thereby, the number of calculation circuits configured to calculate a difference absolute value between image data of pixels positioned in the same coordinates provided to perform the SAD calculation in the image processing device 100 according to the first embodiment can be less than the number of calculation units provided in the image processing unit provided in the conventional imaging device.

More specifically, for example, when a region of each of the first and second target blocks is a region of 5 pixels×5 pixels, it is necessary to provide calculation circuits for 5 pixels×5 pixels for two channels, that is, 50 (=5×5×2) calculation circuits, in the image processing unit provided in the conventional imaging device. On the other hand, it is possible to obtain the extended SAD calculation result by only providing calculation circuits for a region of 6 pixels×5 pixels which is a region of the extended target block, that is, 30 (=6×5) calculation circuits in the extended block SAD calculation unit 120, in the image processing device 100 according to the first embodiment. That is, in the image processing device 100 according to the first embodiment, it is possible to further reduce calculation circuits of a region of 4 pixels×5 pixels which overlap between the first and second target blocks, that is, 20 (=4×5) calculation circuits, compared to the image processing unit provided in the conventional imaging device.

Furthermore, in the image processing device 100 according to the first embodiment, the extended block SAD calculation unit 120 can obtain the first and second subtraction SAD calculation results simultaneously when the extended SAD calculation result is obtained because image data equal in number to the number of SAD calculations performed by the extended block SAD calculation unit 120 is simultaneously input from the serial/parallel conversion unit 110. This is because the first and second subtraction SAD calculation results can be calculated merely by integrating difference absolute values calculated by some calculation circuits of the calculation circuits corresponding to image data, that is, the calculation circuit corresponding to the first subtraction block or the calculation circuit corresponding to the second subtraction block, wherein the calculation circuits are provided in the extended block SAD calculation unit 120 provided in the image processing device 100 according to the first embodiment to obtain the extended SAD calculation result. Thereby, in the image processing device 100 according to the first embodiment, it is possible to simultaneously output the SAD calculation results corresponding to image data while suppressing an increase in circuit scale of a circuit related to the SAD calculation compared to the conventional configuration.

Also, the case in which each region (block) defined to perform the SAD calculation is a region (block) of a shape defined in a direction illustrated in FIGS. 2A, 2B, and 3 has been described in the first embodiment. However, the region (block) defined to perform the SAD calculation is not limited to the shape described in the first embodiment. For example, the concept of the present invention is also similarly applicable to the regions (blocks) of the shapes illustrated in FIGS. 4A to 4C.

Each of FIGS. 4A to 4C is a diagram schematically illustrating another example of a region of pixels on which the SAD calculations are simultaneously performed and a calculation method in the image processing device 100 according to the first embodiment. In FIG. 4A, a positional relationship between a first target block around a target pixel (6, 6) output from the channel ch1 of the image sensor 10 and a first reference block around a reference pixel (2, 2) corresponding to the target pixel (6, 6) output from the channel ch1 of the image sensor 10 is illustrated. In addition, in FIG. 4B, a positional relationship between a second target block around a target pixel (7, 6) output from the channel ch2 of the image sensor 10 and a second reference block around a reference pixel (3, 2) corresponding to the target pixel (7, 6) output from the channel ch2 of the image sensor 10 is illustrated. In addition, in FIG. 4C, an extended target block of a region obtained by combining the first target block and the second target block, an extended reference block of a region obtained by combining the first reference block and the second reference block, and the first and second subtraction blocks within the extended target block are illustrated.

In the image processing device 100 according to the first embodiment, the extended block SAD calculation unit 120 outputs an extended SAD calculation result and first and second subtraction SAD calculation results, which are obtained by performing SAD calculation on a region (block) of each of shapes as illustrated in FIGS. 4A to 4C, to each of the subtraction processing units 131 and 132. Then, each of the subtraction processing unit 131 and 132 subtracts the first or second subtraction SAD calculation result from the extended SAD calculation result input from the extended block SAD calculation unit 120. Thereby, the image processing device 100 according to the first embodiment simultaneously outputs an SAD calculation result corresponding to the first target block around the target pixel (6, 6) output from the channel ch1 of the image sensor 10 illustrated in FIG. 4A and an SAD calculation result corresponding to the second target block around the target pixel (7, 6) output from the channel ch2 of the image sensor 10 illustrated in FIG. 4B.

In this manner, in the image processing device 100 according to the first embodiment, it is possible to simultaneously output the SAD calculation result corresponding to the first target block and the SAD calculation result corresponding to the second target block regardless of the shape of the region (block) of each of the first and second target blocks.

Also, in the first embodiment, an example of a configuration in which the image processing device 100 corresponds to the image sensor 10 configured to simultaneously output image data of two pixels adjacent in the horizontal direction (row direction) x is shown. However, the concept of the image processing device of the present invention is not limited to the configuration in which a direction of the image data simultaneously output by the image sensor is the horizontal direction (row direction) x. For example, it is possible to apply the concept of the present invention similarly even in the configuration in which the image sensor simultaneously outputs image data of two pixels adjacent in the vertical direction (column direction) y or a configuration in which the image sensor simultaneously outputs image data of two pixels adjacent in the horizontal direction (row direction) x and image data of two pixels adjacent in the vertical direction (column direction) y, that is, simultaneously outputs image data of four pixels.

Modified Example of First Embodiment

Here, another example in which the image sensor simultaneously outputs image data will be described. Each of FIGS. 5A and 5B is a diagram schematically illustrating another example of the SAD calculation method in the image processing device according to an embodiment of the present invention. In FIG. 5A, a calculation method of the case corresponding to the image sensor configured to simultaneously output image data of two pixels adjacent in the vertical direction (column direction) y is schematically illustrated. In FIG. 5B, a calculation method of the case corresponding to the image sensor configured to simultaneously output image data of two pixels adjacent in the horizontal direction (row direction) x and image data of two pixels adjacent in the vertical direction (column direction) y is schematically illustrated.

First, the case in which the image processing device, to which the concept of the present invention has been applied, corresponds to the image sensor configured to simultaneously output image data of two pixels adjacent in the vertical direction (column direction) y will be described with reference to FIG. 5A. Even when the image processing device, to which the concept of the present invention has been applied, corresponds to the image sensor configured to simultaneously output image data of two pixels adjacent in the vertical direction (column direction), the extended block SAD calculation unit provided in the image processing device defines each region (block) to be used when the SAD calculation is performed as in the extended block SAD calculation unit 120 provided in the image processing device 100.

Also, the image processing device corresponding to the image sensor configured to simultaneously output image data of two pixels adjacent in the vertical direction (column direction) y has only a difference in a region (block) in which each SAD calculation is performed in the order of input image data, and its configuration can be considered to be similar to that of the image processing device 100. Accordingly, in the following description, the case in which the image sensor 10 illustrated in FIG. 1 simultaneously outputs image data of two pixels adjacent in the vertical direction (column direction) y and the image processing device 100 illustrated in FIG. 1 is an image processing device corresponding to the image sensor configured to simultaneously output the image data of the two pixels adjacent in the vertical direction (column direction) y will be described.

In FIG. 5A, each region (block) defined to obtain a final SAD calculation result corresponding to a first target block around a target pixel (6, 6) output from a channel ch1 of the image sensor 10 and a final SAD calculation result corresponding to a second target block around a target pixel (6, 7) output from a channel ch2 of the image sensor 10 is illustrated.

More specifically, an extended target block of a region of 5 pixels×6 pixels obtained by combining the first target block and the second target block and an extended reference block of a region of 5 pixels×6 pixels obtained by combining the first reference block and the second reference block are illustrated. As seen from FIG. 5A, the target pixel (6, 6) output from the channel ch1 of the image sensor 10 and the target pixel (6, 7) output from the channel ch2 of the image sensor 10 are included within the extended target block. In addition, a reference pixel (2, 2) corresponding to the target pixel (6, 6) output from the channel ch1 of the image sensor 10 and a reference pixel (2, 3) corresponding to the target pixel (6, 7) output from the channel ch2 of the image sensor 10 are included within the extended reference block.

As described above, the extended block SAD calculation unit 120 outputs an extended SAD calculation result obtained by performing SAD calculation based on image data within the defined extended target block and image data within the defined extended reference block to each of the subtraction processing units 131 and 132. Further, the extended block SAD calculation unit 120 outputs a first subtraction SAD calculation result obtained by performing SAD calculation based on image data within the first subtraction block illustrated in FIG. 5A which is not included in the first target block within the defined extended target block and image data of a region (block) in the extended reference block corresponding to the first subtraction block to the subtraction processing unit 131. In addition, the extended block SAD calculation unit 120 outputs a second subtraction SAD calculation result obtained by performing SAD calculation based on image data within the second subtraction block illustrated in FIG. 5A which is not included in the second target block within the defined extended target block and image data of a region (block) in the extended reference block corresponding to the second subtraction block to the subtraction processing unit 132.

Thereby, the subtraction processing unit 131 subtracts the first subtraction SAD calculation result from the extended SAD calculation result, and outputs the SAD calculation result corresponding to the first target block around the target pixel output from the channel ch1 of the image sensor 10 configured to simultaneously output image data of two pixels adjacent in the vertical direction (column direction) y. In addition, the subtraction processing unit 132 subtracts the second subtraction SAD calculation result from the extended SAD calculation result, and outputs the SAD calculation result corresponding to the second target block around the target pixel output from the channel ch2 of the image sensor 10 configured to simultaneously output image data of two pixels adjacent in the vertical direction (column direction) y.

In this manner, it is possible to simultaneously output the SAD calculation result corresponding to the first target block and the SAD calculation result corresponding to the second target block similarly by applying the concept of the present invention even in the configuration in which the image sensor simultaneously outputs image data of two pixels adjacent in the vertical direction (column direction) y.

Next, the case in which the image processing device, to which the concept of the present invention has been applied, corresponds to the image sensor configured to simultaneously output image data of two pixels adjacent in the horizontal direction (row direction) x and image data of two pixels adjacent in the vertical direction (column direction) y will be described with reference to FIG. 5B. Even in the case in which the image processing device, to which the concept of the present invention has been applied, corresponds to the image sensor configured to simultaneously output image data of two pixels adjacent in the horizontal direction (row direction) x and image data of two pixels adjacent in the vertical direction (column direction) y, the extended block SAD calculation unit provided in the image processing device defines each region (block) to be used when the SAD calculation is performed as in the extended block SAD calculation unit 120 provided in the image processing device 100.

However the image processing device corresponding to the image sensor configured to simultaneously output image data of two pixels adjacent in the horizontal direction (row direction) x and image data of two pixels adjacent in the vertical direction (column direction) y has the number of target blocks defined depending on input image data greater than that of the image processing device 100. That is, each of four regions having a predetermined size around target pixels output from each of channels ch1 to ch4 of the image sensor (hereinafter referred to as "first to fourth target blocks") is defined and an extended target block obtained by combining the first to fourth target blocks is defined. Because of this, the configuration of the image processing device corresponding to the image sensor configured to simultaneously output image data of two pixels adjacent in the horizontal direction (row direction) x and image data of two pixels adjacent in the vertical direction (column direction) y is different from the configuration of the image processing device 100, and is a configuration corresponding to the first to fourth target blocks.

FIG. 6 is a block diagram illustrating a schematic configuration of the image processing device when pixel signals of four channels are simultaneously input in the image processing device according to the embodiment of the present invention. The image processing device 200 illustrated in FIG. 6 includes a serial/parallel conversion unit 210, an extended block SAD calculation unit 220, and four subtraction processing units 231 to 234. Also, in FIG. 6, an image sensor 20 mounted on an imaging device and configured to output a pixel signal to the image processing device 200 is also illustrated. However, even in FIG. 6, as in the schematic configuration of the image processing device 100 illustrated in FIG. 1, a component for converting a pixel signal (analog signal) output from each pixel arranged in the image sensor 20 into a digital signal is omitted. In addition, in FIG. 6, a signal line of image data output from the serial/parallel conversion unit 210 to the extended block SAD calculation unit 220 is simplified and illustrated.

Also, the components provided in the image processing device 200 differ only in a region (block) on which SAD calculation is performed depending on input image data, and can be considered to be similar to the components provided in the image processing device 100. Accordingly, in the following description, a detailed description of each component provided in the image processing device 200 will be omitted. Also, in the image processing device 200 illustrated in FIG. 6, the subtraction processing unit 231 corresponds to the channel ch1 of the image sensor 20, the subtraction processing unit 232 corresponds to the channel ch2 of the image sensor 20, the subtraction processing unit 233 corresponds to the channel ch3 of the image sensor 20, and the subtraction processing unit 234 corresponds to the channel ch4 of the image sensor 20.

In FIG. 5B, each region (block) defined to obtain the final SAD calculation result corresponding to the first target block around the target pixel (6, 6) output from the channel ch1 of the image sensor 20 and the final SAD calculation result corresponding to the second target block around the target pixel (7, 6) output from the channel ch2 of the image sensor 20 is illustrated. In addition, in FIG. 5B, each region (block) defined to obtain the final SAD calculation result corresponding to the third target block around the target pixel (6, 7) output from the channel ch3 of the image sensor 20 and the final SAD calculation result corresponding to the fourth target block around the target pixel (7, 7) output from the channel ch4 of the image sensor 20 is illustrated.

More specifically, an extended target block of a region of 6 pixels×6 pixels obtained by combining the first to fourth target blocks and an extended reference block of a region of 6 pixels×6 pixels obtained by combining the first to fourth reference blocks are illustrated. As seen from FIG. 5B, the target pixel (6, 6) output from the channel ch1 of the image sensor 20, the target pixel (7, 6) output from the channel ch2 of the image sensor 20, the target pixel (6, 7) output from the channel ch3 of the image sensor 20, and the target pixel (7, 7) output from the channel ch4 of the image sensor 20 are included within the extended target block. In addition, a reference pixel (2, 2) corresponding to the target pixel (6, 6) output from the channel ch1 of the image sensor 20, a reference pixel (3, 2) corresponding to the target pixel (7, 6) output from the channel ch2 of the image sensor 20, a reference pixel (2, 3) corresponding to the target pixel (6, 7) output from the channel ch3 of the image sensor 20, and a reference pixel (3, 3) corresponding to the target pixel (7, 7) output from the channel ch4 of the image sensor 20 are included within the extended reference block.

Like the extended block SAD calculation unit 120 provided in the image processing device 100, the extended block SAD calculation unit 220 outputs an extended SAD calculation result obtained by performing SAD calculation based on the image data within the defined extended target block and the image data within the defined extended reference block to each of the subtraction processing units 231 to 234. Further, the extended block SAD calculation unit 220 outputs a first subtraction SAD calculation result corresponding to the first subtraction block and the third subtraction block illustrated in FIG. 5B, which are not included in the first target block, within the defined extended target block to the subtraction processing unit 231. However, an SAD calculation result corresponding to image data of a pixel RB in which the first subtraction block and the third subtraction block overlap is not redundantly included in the first subtraction SAD calculation result. In addition, the extended block SAD calculation unit 220 outputs a second subtraction SAD calculation result corresponding to the second subtraction block and the third subtraction block illustrated in FIG. 5B, which are not included in the second target block, within the defined extended target block to the subtraction processing unit 232. However, an SAD calculation result corresponding to image data of a pixel LB in which the second subtraction block and the third subtraction block overlap is not redundantly included in the second subtraction SAD calculation result.

In addition, the extended block SAD calculation unit 220 outputs a third subtraction SAD calculation result corresponding to the first subtraction block and the fourth subtraction block illustrated in FIG. 5B, which are not included in the third target block, within the defined extended target block to the subtraction processing unit 233. However, an SAD calculation result corresponding to image data of a pixel RT in which the first subtraction block and the fourth subtraction block overlap is not redundantly included in the third subtraction SAD calculation result. In addition, the extended block SAD calculation unit 220 outputs a fourth subtraction SAD calculation result corresponding to the second subtraction block and the fourth subtraction block illustrated in FIG. 5B, which is not included in the fourth target block, within the defined extended target block to the subtraction processing unit 234. However, an SAD calculation result corresponding to image data of a pixel LT in which the second subtraction block and the fourth subtraction block overlap is not redundantly included in the fourth subtraction SAD calculation result.

Thereby, the subtraction processing unit 231 subtracts the first subtraction SAD calculation result from the extended SAD calculation result, and outputs an SAD calculation result corresponding to the first target block around the target pixel output from the channel ch1 of the image sensor 20 configured to simultaneously output image data of two pixels adjacent in the horizontal direction (row direction) x and image data of two pixels adjacent in the vertical direction (column direction) y. In addition, the subtraction processing unit 232 subtracts the second subtraction SAD calculation result from the extended SAD calculation result, and outputs an SAD calculation result corresponding to the second target block around the target pixel output from the channel ch2 of the image sensor 20 configured to simultaneously output image data of two pixels adjacent in the horizontal direction (row direction) x and image data of two pixels adjacent in the vertical direction (column direction) y.

In addition, the subtraction processing unit 233 subtracts the third subtraction SAD calculation result from the extended SAD calculation result, and outputs an SAD calculation result corresponding to the third target block around the target pixel output from the channel ch3 of the image sensor 20 configured to simultaneously output image data of two pixels adjacent in the horizontal direction (row direction) x and image data of two pixels adjacent in the vertical direction (column direction) y. In addition, the subtraction processing unit 234 subtracts the fourth subtraction SAD calculation result from the extended SAD calculation result, and outputs an SAD calculation result corresponding to the fourth target block around the target pixel output from the channel ch4 of the image sensor 20 configured to simultaneously output image data of two pixels adjacent in the horizontal direction (row direction) x and image data of two pixels adjacent in the vertical direction (column direction) y.

In this manner, it is possible to apply the concept of the present invention even in the configuration in which the image sensor simultaneously outputs image data of two pixels adjacent in the horizontal direction (row direction) x and image data of two pixels adjacent in the vertical direction (column direction) y, that is, simultaneously outputs image data of four pixels. Then, it is possible to simultaneously output the SAD calculation result corresponding to the first target block, the SAD calculation result corresponding to the second target block, the SAD calculation result corresponding to the third target block, and the SAD calculation result corresponding to the fourth target block.

Also, an example of the case in which image data included in each region (block) in which SAD calculation is performed is not weighted has been described in the first embodiment. However, for example, a process of setting a weight of a higher value when image data is closer to the center of each region (block) in which SAD calculation is performed may be performed for image data on which the SAD calculation is performed in a block matching process in a real imaging device.

Second Embodiment

Figure 7:
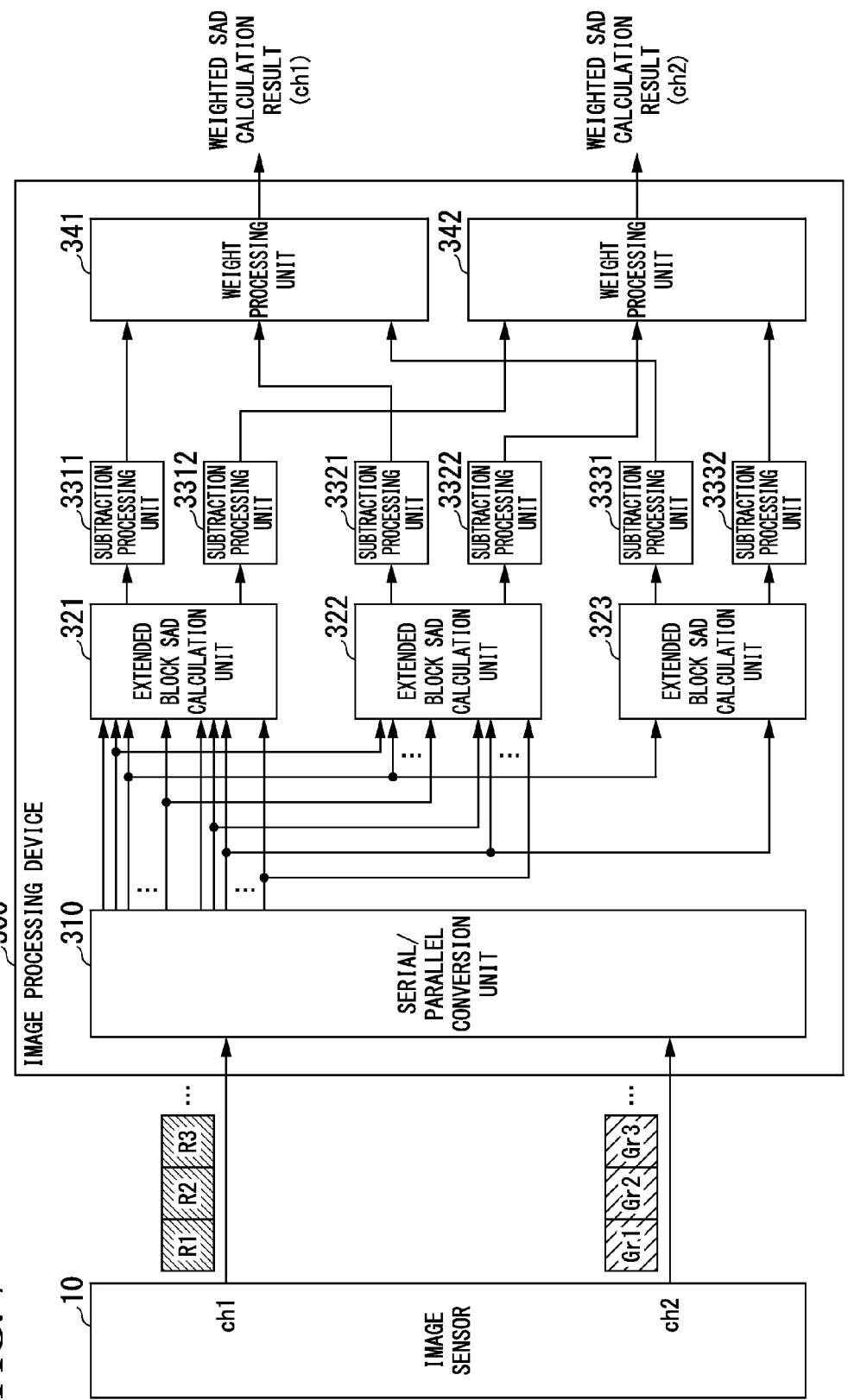
FIG. 7 is a block diagram illustrating a schematic configuration of an image processing device according to a second embodiment of the present invention.

Next, the second embodiment of the present invention will be described. The image processing device according to the second embodiment is an image processing device of a configuration in which SAD calculation is performed depending on a set weight coefficient value (hereinafter referred to as a "weight value") when a weight is set for image data within each target block in which the SAD calculation is performed. FIG. 7 is a block diagram illustrating a schematic configuration of an image processing device according to the second embodiment. The image processing device 300 illustrated in FIG. 7 includes a serial/parallel conversion unit 310, three extended block SAD calculation units 321 to 323, six subtraction processing units 3311 to 3332, and two weight processing units 341 and 342. Moreover, in FIG. 7, an image sensor 10 mounted on the imaging device and configured to output a pixel signal to the image processing device 300 is also illustrated. However, even in FIG. 7, like the schematic configuration of the image processing device 100 according to the first embodiment illustrated in FIG. 1, a component for converting a pixel signal (analog signal) output from each pixel arranged in the image sensor 10 into a digital signal is omitted. In addition, in FIG. 7, a signal line of image data output from the serial/parallel conversion unit 310 to each of the extended block SAD calculation units 321 to 323 is simplified and illustrated.

The image processing device 300 is provided within an image processing unit configured to perform various image processing on a digital signal corresponding to a pixel signal output from each pixel arranged in the image sensor 10. Also, even in FIG. 7, only the configuration of the image processing device 300 according to the second embodiment configured to output an SAD calculation result obtained by performing the SAD calculation for obtaining an SAD of image data corresponding to each image within a region of a predetermined size depending on image data corresponding to each pixel signal output from the image sensor 10 as in the schematic configuration of the image processing device 100 according to the first embodiment illustrated in FIG. 1 is illustrated. Also, the image processing device 300 illustrated in FIG. 7 is an example of a configuration in which the image processing device 300 corresponds to the image sensor 10 of a Bayer arrangement configured to simultaneously output pixel signals of two pixels adjacent in the horizontal direction (row direction) x and three types of weight values are set for image data within a target block in which SAD calculation is finally performed.

Also, in the following description, for ease of the description, the image sensor 10 will be described as that configured to output image data corresponding to the pixel signal from each channel as in the description of the image processing device 100 according to the first embodiment. Even in FIG. 7, a state in which image data (R1, R2, R3, . . . ) corresponding to pixel signals of R pixels from the channel ch1 of the image sensor 10 and image data (Gr1, Gr2, Gr3, . . . ) corresponding to pixel signals of Gr pixels from the channel ch2 are simultaneously sequentially input to the image processing device 300 is illustrated.

Like the serial/parallel conversion unit 110 provided in the image processing device 100 according to the first embodiment, the serial/parallel conversion unit 310 temporarily stores image data sequentially (in series) input from each channel of the image sensor 10 and simultaneously (in parallel) outputs the stored image data equal in number to the number of pieces thereof to be used when each of the extended block SAD calculation units 321 to 323 of the subsequent stage performs SAD calculation. Also, because the configuration and operation of the serial/parallel conversion unit 310 are similar to those of the serial/parallel conversion unit 110 according to the first embodiment illustrated in FIG. 1, a detailed description thereof will be omitted.

Like the extended block SAD calculation unit 120 provided in the image processing device 100 according to the first embodiment, each of the extended block SAD calculation units 321 to 323 performs SAD calculation based on image data simultaneously input from the serial/parallel conversion unit 310, and outputs an SAD calculation result after the SAD calculation to each of the subtraction processing units of the subsequent stage corresponding to each channel of the image sensor 10. Also, because the configuration and operation of each of the extended block SAD calculation units 321 to 323 are similar to those of the extended block SAD calculation unit 120 according to the first embodiment illustrated in FIG. 1, a detailed description thereof will be omitted. Also, the number of calculation circuits configured to calculate a difference absolute value between image data provided in each of the extended block SAD calculation units 321 to 323 may differ depending on the number of pixels included in the corresponding extended target block.

Also, as described above, in the image processing device 300, three types of weight values are set in image data within each target block in which SAD calculation is finally performed. Because of this, each of the extended block SAD calculation units 321 to 323 performs SAD calculation for every region (block) in which the same weight value has been set within the target block. Because of this, the concept when each of the extended block SAD calculation units 321 to 323 defines each region (block) such as the first target block, the second target block, the extended target block, the first subtraction block, or the second subtraction block is similar to that of the extended block SAD calculation unit 120, but a size of a region of each block is different in each of the extended block SAD calculation units 321 to 323.

Like the subtraction processing unit 131 or 132 provided in the image processing device 100 according to the first embodiment, each of the subtraction processing units 3311 to 3332 outputs an SAD calculation result corresponding to a channel of the image sensor 10 to the corresponding weight processing unit 341 or 342 of the subsequent stage, based on an extended SAD calculation result and the first or second subtraction SAD calculation result input from each of the extended block SAD calculation units 321 to 323. Also, in the image processing device 300 illustrated in FIG. 7, each of the subtraction processing units 3311, 3321, and 3331 corresponds to the channel ch1 of the image sensor 10, and each of the subtraction processing units 3312, 3322, and 3332 corresponds to the channel ch2 of the image sensor 10. Also, because the configuration and operation of each of the subtraction processing units 3311 to 3332 are similar to those of the subtraction processing units 131 to 132 according to the first embodiment illustrated in FIG. 1, a detailed description thereof will be omitted.

Each of the weight processing units 341 and 342 performs a weighting process of multiplying a weight value for an SAD calculation result input from the corresponding subtraction processing unit and adding the SAD calculation results multiplied by the weight values, and outputs the SAD calculation result after the weighting process is performed (hereinafter referred to as a "weighted SAD calculation result"). Also, in the image processing device 300 illustrated in FIG. 7, the weight processing unit 341 corresponds to the channel ch1 of the image sensor 10 and the weight processing unit 342 corresponds to the channel ch2 of the image sensor 10.

Through this configuration, in the image processing device 300, the weighted SAD calculation result corresponding to the channel ch1 of the image sensor 10 and the weighted SAD calculation result corresponding to the channel ch2 of the image sensor 10 are simultaneously output. That is, in the image processing device 300, the SAD calculation result of the region (block) corresponding to the channel ch1 of the image sensor 10 in which the same first weight value is set within the first target block is output through the configurations of the extended block SAD calculation unit 321 and the subtraction processing unit 3311. In addition, in the image processing device 300, the SAD calculation result of the region (block) corresponding to the channel ch1 of the image sensor 10 in which the same second weight value is set within the first target block is output through the configurations of the extended block SAD calculation unit 322 and the subtraction processing unit 3321. In addition, in the image processing device 300, the SAD calculation result of the region (block) corresponding to the channel ch1 of the image sensor 10 in which the same third weight value is set within the first target block is output through the configurations of the extended block SAD calculation unit 323 and the subtraction processing unit 3331. Then, in the image processing device 300, the weight processing unit 341 outputs a weighted SAD calculation result corresponding to the channel ch1 of the image sensor 10 by performing a weighting process on the SAD calculation result of each region (block) in which the first to third weight values output by the subtraction processing units 3311, 3321, and 3331 are set.

In addition, simultaneously, in the image processing device 300, the SAD calculation result of the region (block) corresponding to the channel ch2 of the image sensor 10 in which the same first weight value is set within the second target block is output through the configurations of the extended block SAD calculation unit 321 and the subtraction processing unit 3312. In addition, in the image processing device 300, the SAD calculation result of the region (block) corresponding to the channel ch2 of the image sensor 10 in which the same second weight value is set within the second target block is output through the configurations of the extended block SAD calculation unit 322 and the subtraction processing unit 3322. In addition, in the image processing device 300, the SAD calculation result of the region (block) corresponding to the channel ch2 of the image sensor 10 in which the same third weight value is set within the second target block is output through the configurations of the extended block SAD calculation unit 323 and the subtraction processing unit 3332. Then, in the image processing device 300, the weight processing unit 342 outputs a weighted SAD calculation result corresponding to the channel ch2 of the image sensor 10 by performing a weighting process on the SAD calculation result of each region (block) in which the first to third weight values output by the subtraction processing units 3312, 3322, and 3332 are set.

Figure 8:
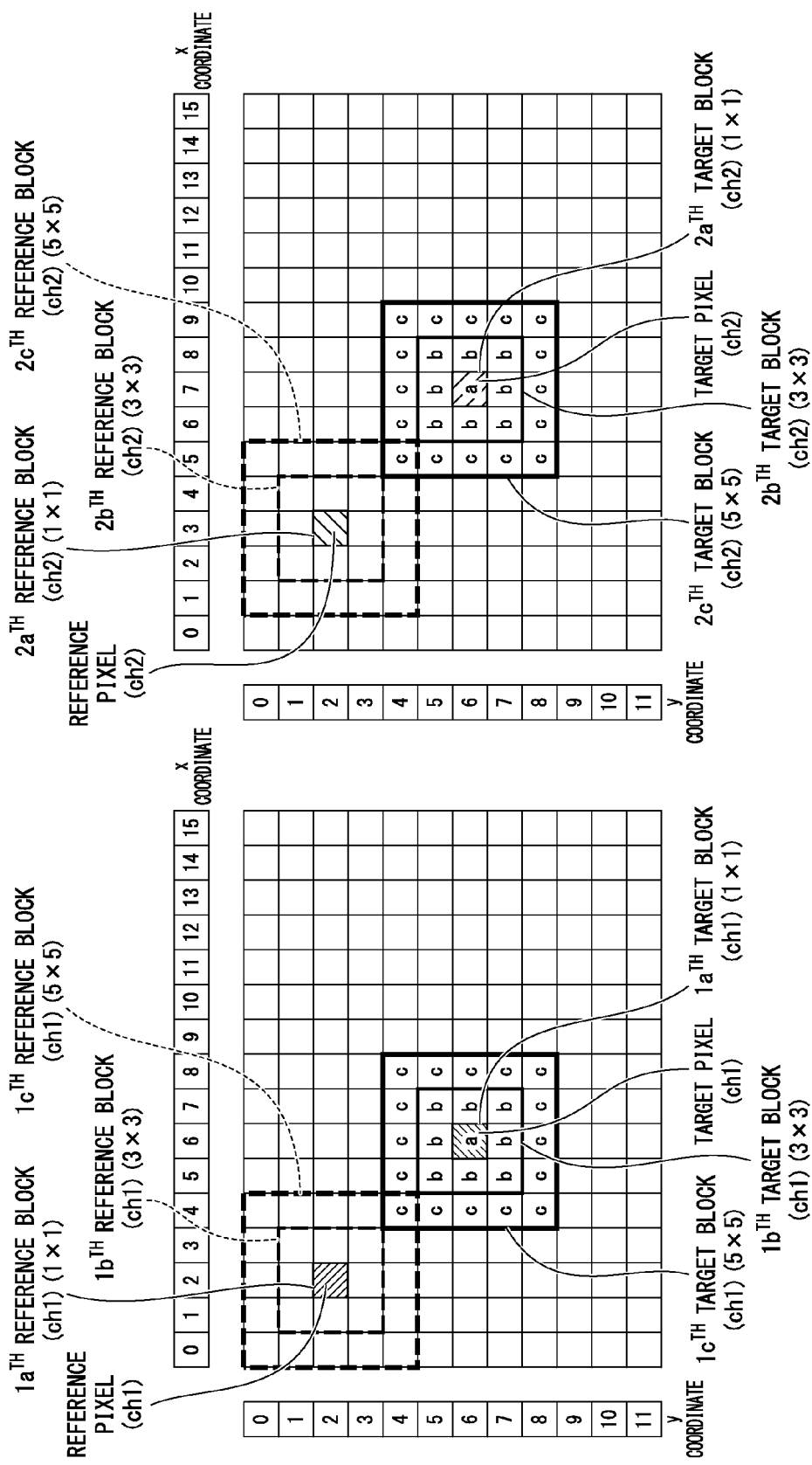
FIG. 8A is a diagram schematically illustrating an example of a region of pixels on which SAD calculations are simultaneously performed in the image processing device according to the second embodiment.
FIG. 8B is a diagram schematically illustrating an example of a region of pixels on which the SAD calculations are simultaneously performed in the image processing device of the second embodiment.

Next, a method of performing the SAD calculation corresponding to each channel of the image sensor 10 in the image processing device 300 according to the second embodiment will be described. First, a region in which the SAD calculations are simultaneously performed will be described using FIGS. 8A and 8B. Each of FIGS. 8A and 8B is a diagram schematically illustrating an example of a region of pixels on which SAD calculations are simultaneously performed in the image processing device 300 according to the second embodiment. A positional relationship between the first target block around the target pixel output from the channel ch1 of the image sensor 10 and the first reference block is illustrated in FIG. 8A, and a positional relationship between the second target block around the target pixel output from the channel ch2 of the image sensor 10 and the second reference block is illustrated in FIG. 8B.

As seen from FIGS. 8A and 8B, even in the image processing device 300 according to the second embodiment, a positional relationship between the target pixels and the reference pixels for each channel in the case in which the image sensor 10 simultaneously outputs image data of two pixels adjacent in the horizontal direction x is that the two pixels are adjacent in the horizontal direction x as in the positional relationship of the target pixels and the positional relationship of the reference pixels for each channel output by the image sensor 10 according to the first embodiment illustrated in FIGS. 2A and 2B. That is, the target pixel output from the channel ch1 of the image sensor 10 and the target pixel output from the channel ch2 of the image sensor 10 are two pixels adjacent in the horizontal direction x, and the reference pixel corresponding to the target pixel output from the channel ch1 of the image sensor 10 and the reference pixel corresponding to the target pixel output from the channel ch2 of the image sensor 10 are also two pixels adjacent in the horizontal direction x.

Then, in the image processing device 300 according to the second embodiment, as described above, three types of weight values are set in image data within each target block in which SAD calculation is finally performed. In the example illustrated in FIGS. 8A and 8B, the case in which a higher weight value is set when image data is closer to the center of the target block to obtain a final weighted SAD calculation result is illustrated. Also, in the following description, the relationship of weight values a to c set in image data will be described as the relationship of weight value a>weight value b>weight value c. That is, the weight value a is described as a highest value and the weight value c is described as a lowest value.

More specifically, in the example illustrated in FIGS. 8A and 8B, the highest weight value a is set in image data of the target pixel (6, 6) of a coordinate position of the horizontal direction x=6 and the vertical direction y=6 output from the channel ch1 of the image sensor 10, the weight value b is set in image data of eight pixels around the target pixel (6, 6), and the lowest weight value c is set in image data of 16 farther peripheral pixels. Likewise, the highest weight value a is set in image data of the target pixel (7, 6) of a coordinate position of the horizontal direction x=7 and the vertical direction y=6 output from the channel ch2 of the image sensor 10, the weight value b is set in image data of eight pixels around the target pixel (7, 6), and the lowest weight value c is set in image data of 16 farther peripheral pixels.

Also, as seen by comparing FIGS. 8A and 8B, there is a case in which the set weight value is different between when SAD calculation is performed using image data of the same pixel input from the image sensor 10 as a pixel included in the first target block and when SAD calculation is performed using the image data of the same pixel input from the image sensor 10 as a pixel included in the second target block. For example, although the weight value is the weight value c when SAD calculation is performed using a pixel (8, 5) positioned in a coordinate position of the horizontal direction x=8 and the vertical direction y=5 as a pixel included in the first target block, the weight value is the weight value b when SAD calculation is performed using the pixel (8, 5) as a pixel included in the second target block.

Because of this, each of the extended block SAD calculation units 321 to 323 performs SAD calculation for each region (block) in which the same weight value is set within the target block as described above. Therefore, the extended block SAD calculation unit 321 defines each of a region of the weight value c or more around the target pixel (6, 6) output from the channel ch1 of the image sensor 10 (hereinafter referred to as a "$1c^{th}$ target block") and a region of the weight value c or more around the target pixel (7, 6) output from the channel ch2 (hereinafter referred to as a "$2c^{th}$ target block"). In addition, the extended block SAD calculation unit 322 defines each of a region of the weight value b or more around the target pixel (6, 6) output from the channel ch1 of the image sensor 10 (hereinafter referred to as a "$1b^{th}$ target block") and a region of the weight value b or more around the target pixel (7, 6) output from the channel ch2 (hereinafter referred to as a "$2b^{th}$ target block"). In addition, the extended block SAD calculation unit 323 defines each of a region of the weight value a or more around the target pixel (6, 6) output from the channel ch1 of the image sensor 10 (hereinafter referred to as a "$1a^{th}$ target block") and a region of the weight value a or more around the target pixel (7, 6) output from the channel ch2 (hereinafter referred to as a "$2a^{th}$ target block").

More specifically, in the example illustrated in FIGS. 8A and 8B, the extended block SAD calculation unit 321 defines a region of 5 pixels×5 pixels around the target pixel (6, 6) output from the channel ch1 of the image sensor 10 as the $1c^{th}$ target block, and defines a region of 5 pixels×5 pixels around the target pixel (7, 6) output from the channel ch2 of the image sensor 10 as the $2c^{th}$ target block. In addition, the extended block SAD calculation unit 322 defines a region of 3 pixels×3 pixels around the target pixel (6, 6) output from the channel ch1 of the image sensor 10 as the $1b^{th}$ target block, and defines a region of 3 pixels×3 pixels around the target pixel (7, 6) output from the channel ch2 of the image sensor 10 as the $2b^{th}$ target block. In addition, the extended block SAD calculation unit 323 defines a region of 1 pixel×1 pixel around the target pixel (6, 6) output from the channel ch1 of the image sensor 10 as the $1a^{th}$ target block, and defines a region of 1 pixel×1 pixel around the target pixel (7, 6) output from the channel ch2 of the image sensor 10 as the $2a^{th}$ target block. Also, in the example illustrated in FIGS. 8A and 8B, each of the $1a^{th}$ and $2a^{th}$ target blocks is a region of only the target pixel (6, 6) output from the channel ch1 of the image sensor 10 or the target pixel (7, 6) output from the channel ch2 of the image sensor 10.

Also, the $1c^{th}$ and $2c^{th}$ target blocks defined by the extended block SAD calculation unit 321 are target blocks for obtaining a final weighted SAD calculation result. Also, in the following description, when each of the $1a^{th}$ target block, the $1b^{th}$ target block, and the $1c^{th}$ target block is represented without being distinguished, it is referred to as a "first weighted target block." When each of the $2a^{th}$ target block, the $2b^{th}$ target block, and the $2c^{th}$ target block is represented without being distinguished, it is referred to as a "second weighted target block."

In addition, each of the extended block SAD calculation units 321 to 323 corresponds to the defined first weighted target block, and defines each of the $1a^{th}$ reference block, the $1b^{th}$ reference block, and the $1c^{th}$ reference block around the reference pixel (2, 2) corresponding to the target pixel (6, 6) output from the channel ch1 of the image sensor 10. Likewise, the extended block SAD calculation units 321 to 323 correspond to the defined second weighted target block, and define the $2a^{th}$ reference block, the $2b^{th}$ reference block, and the $2c^{th}$ reference block around the reference pixel (3, 2) corresponding to the target pixel (7, 6) output from the channel ch2 of the image sensor 10.

More specifically, in the example illustrated in FIGS. 8A and 8B, the extended block SAD calculation unit 321 defines a region of 5 pixels×5 pixels around a reference pixel (2, 2) corresponding to the target pixel (6, 6) output from the channel ch1 of the image sensor 10 as the $1c^{th}$ reference block, and defines a region of 5 pixels×5 pixels around a reference pixel (3, 2) corresponding to the target pixel (7, 6) output from the channel ch2 as the $2c^{th}$ reference block. In addition, the extended block SAD calculation unit 322 defines a region of 3 pixels×3 pixels around the reference pixel (2, 2) corresponding to the target pixel (6, 6) output from the channel ch1 of the image sensor 10 as the $1b^{th}$ reference block, and defines a region of 3 pixels×3 pixels around the reference pixel (3, 2) corresponding to the target pixel (7, 6) output from the channel ch2 as the $2b^{th}$ reference block. In addition, the extended block SAD calculation unit 323 defines a region of 1 pixel×1 pixel around the reference pixel (2, 2) corresponding to the target pixel (6, 6) output from the channel ch1 of the image sensor 10 as the $1a^{th}$ reference block, and defines a region of 1 pixel×1 pixel around the reference pixel (3, 2) corresponding to the target pixel (7, 6) output from the channel ch2 as the $2a^{th}$ reference block. Also, in the example illustrated in FIGS. 8A and 8B, as in each of the $1a^{th}$ and $2a^{th}$ target blocks, each of the $1a^{th}$ and $2a^{th}$ reference blocks is a region of only the reference pixel (2, 2) corresponding to the target pixel (6, 6) output from the channel ch1 of the image sensor 10 or the reference pixel (3, 2) corresponding to the target pixel (7, 6) output from the channel ch2 of the image sensor 10.

Also, in the following description, when each of the $1a^{th}$ reference block, the $1b^{th}$ reference block, and the $1c^{th}$ reference block is represented without being distinguished, it is referred to as a "first weighted reference block." When each of the $2a^{th}$ reference block, the $2b^{th}$ reference block, and the $2c^{th}$ reference block is represented without being distinguished, it is referred to as a "second weighted reference block."

Each difference absolute value between image data of pixels positioned in the same coordinates in the $1c^{th}$ target block and the $1c^{th}$ reference block defined here is calculated, and an SAD calculation result integrated after multiplying the calculated difference absolute value by a corresponding weight value is a final weighted SAD calculation result corresponding to the target pixel (6, 6) output from the channel ch1 of the image sensor 10. In addition, each difference absolute value between image data of pixels positioned in the same coordinates in the $2c^{th}$ target block and the $2c^{th}$ reference block defined here is calculated, and an SAD calculation result integrated after multiplying the calculated difference absolute value by a corresponding weight value is a final weighted SAD calculation result corresponding to the target pixel (7, 6) output from the channel ch2 of the image sensor 10.

Also, in the image processing unit provided in the conventional imaging device, SAD calculation units configured to calculate each difference absolute value between image data of pixels positioned in the same coordinates in the target block and the reference block and perform integration after multiplying the calculated difference absolute value by a corresponding weight value are provided to be equal in number to channels through which the image sensor 10 outputs image data, and therefore simultaneously output SAD calculation results corresponding to target blocks. That is, in the image processing unit provided in the conventional imaging device, calculation circuits configured to perform a weighting process after calculating the difference absolute value are provided to be equal in number to the number of pieces of image data included within the target block.

Figure 9:
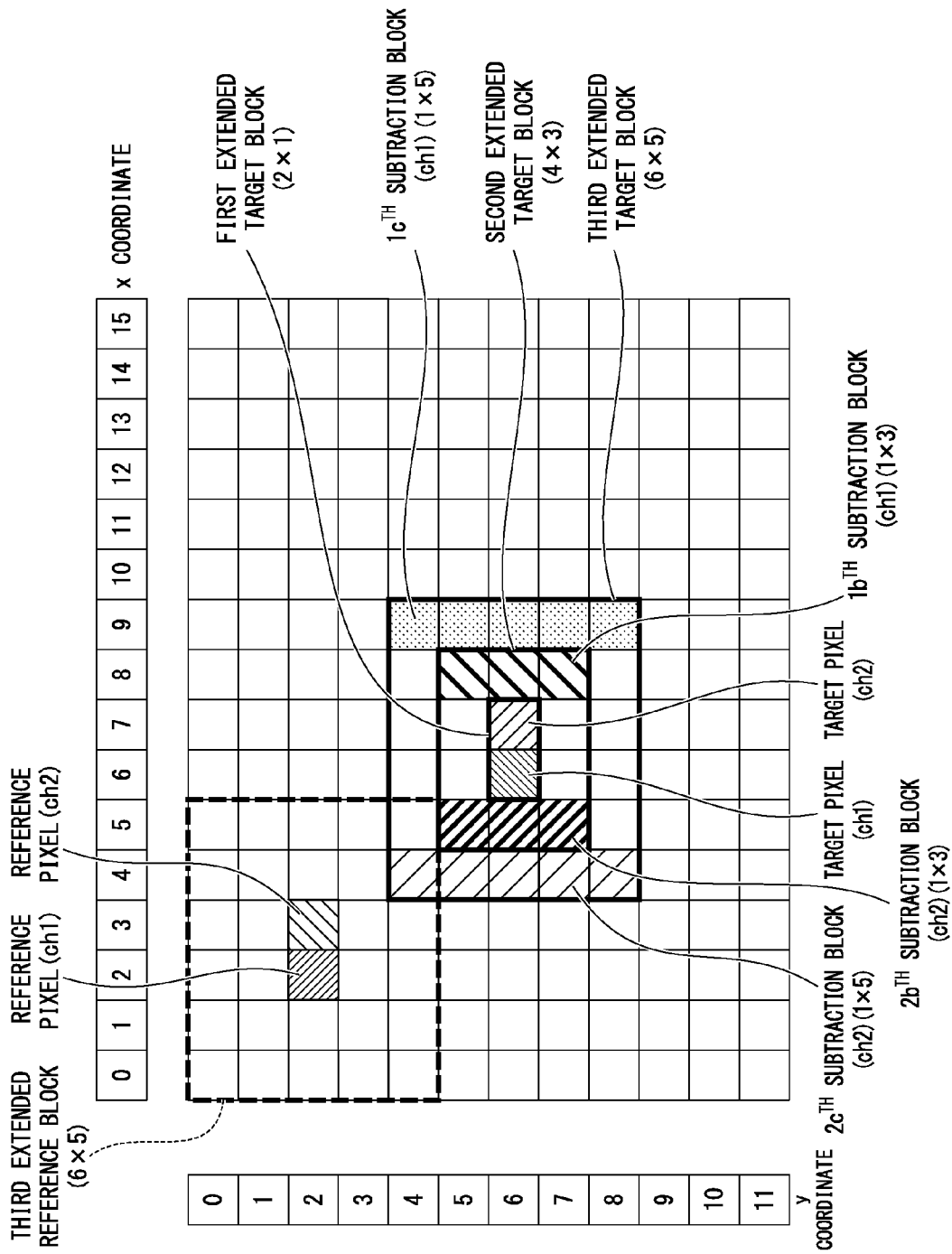
FIG. 9 is a diagram schematically illustrating an SAD calculation method in the image processing device according to the second embodiment.

On the other hand, in the image processing device 300 according to the second embodiment, each of the extended block SAD calculation units 321 to 323 defines each of an extended target block obtained by combining the first and second weighted target blocks and an extended reference block obtained by combining the first and second weighted reference blocks, as in the extended block SAD calculation unit 120 provided in the image processing device 100 according to the first embodiment. FIG. 9 is a diagram schematically illustrating an SAD calculation method in the image processing device 300 according to the second embodiment. In FIG. 9, a state in which each of the extended block SAD calculation units 321 to 323 defines each of the extended target block and the extended reference block is illustrated.

More specifically, the extended block SAD calculation unit 321 defines each of a third extended target block of a region of 6 pixels×5 pixels obtained by combining the $1c^{th}$ target block and the $2c^{th}$ target block and a third extended reference block of a region of 6 pixels×5 pixels obtained by combining the $1c^{th}$ reference block and the $2c^{th}$ reference block. In addition, likewise, the extended block SAD calculation unit 322 defines each of a second extended target block of a region of 4 pixels×3 pixels obtained by combining the $1b^{th}$ target block and the $2b^{th}$ target block and a second extended reference block (not illustrated) of a region of 4 pixels×3 pixels obtained by combining the $1b^{th}$ reference block and the $2b^{th}$ reference block. In addition, likewise, the extended block SAD calculation unit 323 defines each of a first extended target block of a region of 2 pixels×1 pixel obtained by combining the $1a^{th}$ target block and the $2a^{th}$ target block and a first extended reference block (not illustrated) of a region of 2 pixels×1 pixel obtained by combining the $1a^{th}$ reference block and the $1a^{th}$ reference block. Also, in the example illustrated in FIG. 9, the first extended target block is a region including only the target pixel (6, 6) output from the channel ch1 of the image sensor 10 and the target pixel (7, 6) output from the channel ch2 of the image sensor 10. Also, likewise, as in the first extended target block, the first extended reference block (not illustrated) is a region including only the reference pixel (2, 2) corresponding to the target pixel (6, 6) output from the channel ch1 of the image sensor 10 and the reference pixel (3, 2) corresponding to the target pixel (7, 6) output from the channel ch2 of the image sensor 10.

As seen from FIG. 9, the target pixel (6, 6) output from the channel ch1 of the image sensor 10 and the target pixel (7, 6) output from the channel ch2 of the image sensor 10 are included within the third extended target block. In addition, the reference pixel (2, 2) corresponding to the target pixel (6, 6) output from the channel ch1 of the image sensor 10 and the reference pixel (3, 2) corresponding to the target pixel (7, 6) output from the channel ch2 of the image sensor 10 are included within the third extended reference block. Likewise, the target pixel (6, 6) output from the channel ch1 of the image sensor 10 and the target pixel (7, 6) output from the channel ch2 of the image sensor 10 are included within the second extended target block and the first extended target block. Likewise, the reference pixel (2, 2) corresponding to the target pixel (6, 6) output from the channel ch1 of the image sensor 10 and the reference pixel (3, 2) corresponding to the target pixel (7, 6) output from the channel ch2 of the image sensor 10 are included within the second extended reference block (not illustrated) and the first extended reference block (not illustrated).

Also, in the following description, when each of the third extended target block, the second extended target block, and the first extended target block is represented without being distinguished, it is referred to as an "extended target block." When each of the third extended reference block, the second extended reference block, and the first extended reference block is represented without being distinguished, it is referred to as an "extended reference block."

Then, in the image processing device 300 according to the second embodiment, the extended block SAD calculation units 321 to 323 perform SAD calculation based on image data within the defined extended target blocks and image data within the defined extended reference blocks, and output extended SAD calculation results corresponding to the extended target blocks to each of the corresponding subtraction processing units 3311 to 3332.

More specifically, the extended block SAD calculation unit 321 outputs a third extended SAD calculation result obtained by performing SAD calculation based on image data within the defined third extended target block and image data within the defined third extended reference block to the subtraction processing units 3311 and 3312. In addition, likewise, the extended block SAD calculation unit 322 outputs a second extended SAD calculation result obtained by performing SAD calculation based on image data within the defined second extended target block and image data within the defined second extended reference block (not illustrated) to the subtraction processing units 3321 and 3322. In addition, likewise, the extended block SAD calculation unit 323 outputs a first extended SAD calculation result obtained by performing SAD calculation based on image data within the defined first extended target block and image data within the defined first extended reference block (not illustrated) to the subtraction processing units 3331 and 3332.

At this time, the extended SAD calculation results, which are output by the extended block SAD calculation units 321 to 323, corresponding to the extended target blocks around the target pixel (6, 6) output from the channel ch1 of the image sensor 10 illustrated in FIG. 9 are represented by the above Equation (2) as in the extended block SAD calculation unit 120 provided in the image processing device 100 according to the first embodiment. Also, each of the extended SAD calculation results is a variable differing depending on the sizes of regions of the third extended target block, the second extended target block, and the first extended target block and is a value calculated by the above Equation (2).

Further, in the image processing device 300 according to the second embodiment, the extended block SAD calculation units 321 to 323 output first subtraction SAD calculation results to the corresponding subtraction processing units 3311, 3321, and 3331, respectively, as in the extended block SAD calculation unit 120 provided in the image processing device 100 according to the first embodiment.

More specifically, the extended block SAD calculation unit 321 outputs a $1c^{th}$ subtraction SAD calculation result obtained by performing SAD calculation based on image data within a block which is not included in the $1c^{th}$ target block, that is, a $1c^{th}$ subtraction block illustrated in FIG. 9, within the defined third extended target block and image data of a region within a third extended reference block corresponding to the $1c^{th}$ subtraction block, to the subtraction processing unit 3311. In addition, likewise, the extended block SAD calculation unit 322 outputs a $1b^{th}$ subtraction SAD calculation result obtained by performing SAD calculation based on image data within a block which is not included in the $1b^{th}$ target block, that is, a $1b^{th}$ subtraction block illustrated in FIG. 9, within the defined second extended target block and image data of a region within a second extended reference block (not illustrated) corresponding to the $1b^{th}$ subtraction block, to the subtraction processing unit 3321. In addition, likewise, the extended block SAD calculation unit 323 outputs a $1a^{th}$ subtraction SAD calculation result, that is, an SAD calculation result of only a target pixel (7, 6), obtained by performing SAD calculation based on image data of a block which is not included in the $1a^{th}$ target block, that is, the target pixel (7, 6) illustrated in FIG. 9, within the defined first extended target block and image data of a reference pixel (3, 2) corresponding to the target pixel (7, 6), to the subtraction processing unit 3331.

Thereby, the subtraction processing units 3311, 3321, and 3331 obtain SAD calculation results corresponding to a first weighted target block by subtracting a corresponding first subtraction SAD calculation result from extended SAD calculation results input from the corresponding extended block SAD calculation units 321 to 323, respectively. Then, each of the subtraction processing units 3311, 3321, and 3331 outputs an SAD calculation result corresponding to the first weighted target block to the weight processing unit 341.

At this time, each of SAD calculation results, which are output by the subtraction processing units 3311, 3321, and 3331, corresponding to the first weighted target block around the target pixel (6, 6) output from the channel ch1 of the image sensor 10 illustrated in FIG. 8A is represented by the above Equation (3), as in the extended block SAD calculation unit 120 provided in the image processing device 100 according to the first embodiment. Also, each of the SAD calculation results is a variable differing depending on the sizes of regions of the third extended target block and the $1c^{th}$ subtraction block, the second extended target block and the $1b^{th}$ subtraction block, or the first extended target block and the $1a^{th}$ subtraction block, and is a value calculated by the above Equation (3).

In addition, in the image processing device 300 according to the second embodiment, the extended block SAD calculation units 321 to 323 output second subtraction SAD calculation results to the corresponding subtraction processing units 3312, 3322, and 3332, respectively, as in the extended block SAD calculation unit 120 provided in the image processing device 100 according to the first embodiment.

More specifically, the extended block SAD calculation unit 321 outputs a $2c^{th}$ subtraction SAD calculation result obtained by performing SAD calculation based on image data within a block which is not included in the $2c^{th}$ target block, that is, a $2c^{th}$ subtraction block illustrated in FIG. 9, within the defined third extended target block and image data of a region within a third extended reference block corresponding to the $2c^{th}$ subtraction block, to the subtraction processing unit 3312. In addition, likewise, the extended block SAD calculation unit 322 outputs a $2b^{th}$ subtraction SAD calculation result obtained by performing SAD calculation based on image data within a block which is not included in the $2b^{th}$ target block, that is, a $2b^{th}$ subtraction block illustrated in FIG. 9, within the defined second extended target block and image data of a region within a second extended reference block (not illustrated) corresponding to the $2b^{th}$ subtraction block, to the subtraction processing unit 3322. In addition, likewise, the extended block SAD calculation unit 323 outputs a $2a^{th}$ subtraction SAD calculation result, that is, an SAD calculation result of only a target pixel (6, 6), obtained by performing SAD calculation based on image data of a block which is not included in the $2a^{th}$ target block, that is, the target pixel (6, 6) illustrated in FIG. 9, within the defined first extended target block and image data of a reference pixel (2, 2) corresponding to the target pixel (6, 6), to the subtraction processing unit 3332.

Thereby, the subtraction processing units 3312, 3322, and 3332 obtain SAD calculation results corresponding to a second weighted target block by subtracting a corresponding second subtraction SAD calculation result from extended SAD calculation results input from the corresponding extended block SAD calculation units 321 to 323, respectively. Then, each of the subtraction processing units 3312, 3322, and 3332 outputs an SAD calculation result corresponding to the second weighted target block to the weight processing unit 342.

At this time, each of SAD calculation results, which are output by the subtraction processing units 3312, 3322, and 3332, corresponding to the second weighted target block around the target pixel (7, 6) output from the channel ch2 of the image sensor 10 illustrated in FIG. 8B is represented by the above Equation (4), as in the extended block SAD calculation unit 120 provided in the image processing device 100 according to the first embodiment. Also, each of the SAD calculation results is a variable differing depending on the sizes of regions of the third extended target block and the $2c^{th}$ subtraction block, the second extended target block and the $2b^{th}$ subtraction block, or the first extended target block and the $1a^{th}$ subtraction block, and is a value calculated by the above Equation (4).

Thereafter, in the image processing device 300 according to the second embodiment, the weight processing units 341 and 342 perform a weighting process of multiplying the SAD calculation results input from the corresponding subtraction processing units 3311 to 3332 by corresponding weight values and then adding SAD calculation results that have been multiplied by the weight values. Then, the weight processing units 341 and 342 output weighted SAD calculation results after weighting processes are performed as the weighted SAD calculation result corresponding to the channel ch1 of the image sensor 10 and the weighted SAD calculation result corresponding to the channel ch2 of the image sensor 10, respectively.

Figure 10A:
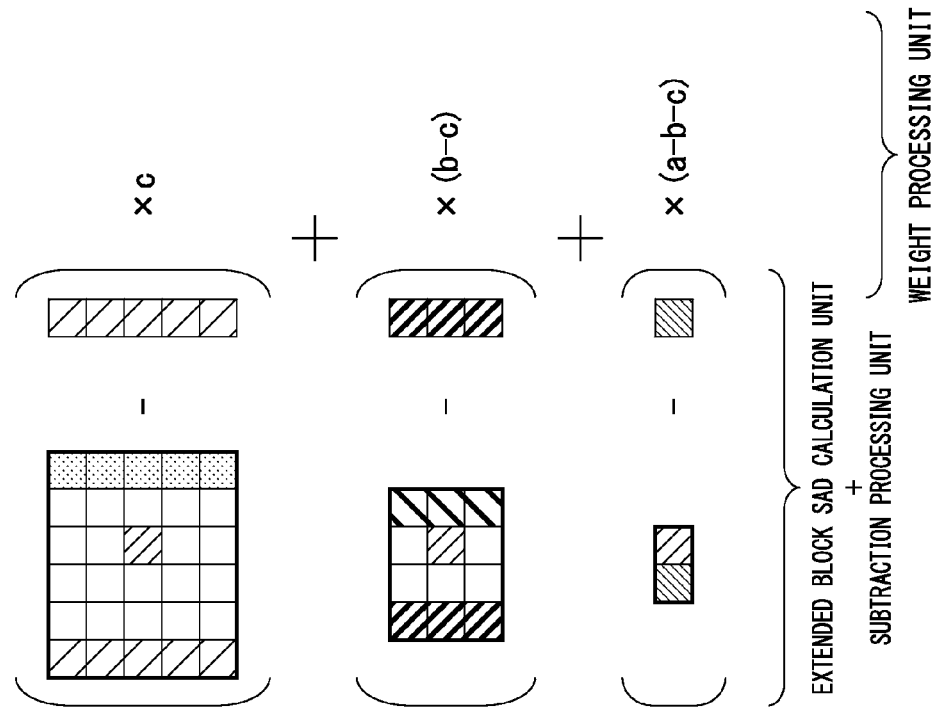
FIG. 10A is a diagram schematically illustrating the SAD calculation method in the image processing device according to the second embodiment.
Figure 10B:
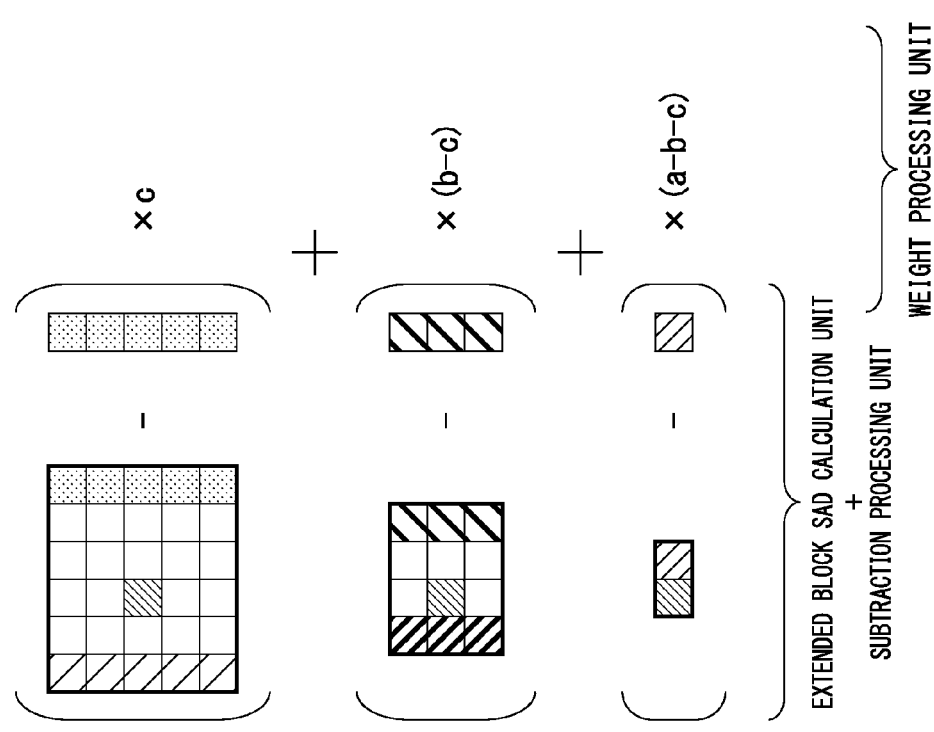
FIG. 10B is a diagram schematically illustrating the SAD calculation method in the image processing device according to the second embodiment.

Each of FIGS. 10A and 10B is a diagram schematically illustrating the SAD calculation method in the image processing device 300 according to the second embodiment. In FIG. 10A, content of the weighting process performed by the weight processing unit 341 is schematically illustrated. In FIG. 10B, content of the weighting process performed by the weight processing unit 342 is schematically illustrated.

First, the weighting process by the weight processing unit 341 will be described with reference to FIG. 10A. As described above, the extended block SAD calculation unit 321 outputs a third extended SAD calculation result corresponding to the third extended target block illustrated in FIG.

9 and the $1c^{th}$ subtraction SAD calculation result corresponding to the $1c^{th}$ subtraction block to the subtraction processing unit 3311.

Then, the subtraction processing unit 3311 subtracts the $1c^{th}$ subtraction SAD calculation result from the third extended SAD calculation result, and outputs the SAD calculation result corresponding to the $1c^{th}$ target block illustrated in FIGS. 8A and 8B to the weight processing unit 341 (see the upper portion of FIG. 10A). In addition, likewise, the extended block SAD calculation unit 322 outputs a second extended SAD calculation result corresponding to the second extended target block illustrated in FIG. 9 and the $1b^{th}$ subtraction SAD calculation result corresponding to the $1b^{th}$ subtraction block to the subtraction processing unit 3321. Then, the subtraction processing unit 3321 subtracts the $1b^{th}$ subtraction SAD calculation result from the second extended SAD calculation result, and outputs the SAD calculation result corresponding to the $1b^{th}$ target block illustrated in FIGS. 8A and 8B to the weight processing unit 341 (see the middle portion of FIG. 10A). In addition, likewise, the extended block SAD calculation unit 323 outputs a first extended SAD calculation result corresponding to the first extended target block illustrated in FIG. 9 and the $1a^{th}$ subtraction SAD calculation result corresponding to the $1a^{th}$ subtraction block, that is, the SAD calculation result of only the target pixel (7, 6), to the subtraction processing unit 3331. Then, the subtraction processing unit 3331 subtracts the $1a^{th}$ subtraction SAD calculation result from the first extended SAD calculation result, and outputs the SAD calculation result corresponding to the $1a^{th}$ target block illustrated in FIGS. 8A and 8B, that is, the SAD calculation result of only the target pixel (6, 6), to the weight processing unit 341 (see the lower portion of FIG. 10A).

Then, the weight processing unit 341 multiplies an SAD calculation result corresponding to the $1c^{th}$ target block input from the subtraction processing unit 3311 by the set lowest weight value c (see the upper portion of FIG. 10A). Thereby, an SAD calculation result equal to an integrated SAD calculation result after multiplying a difference absolute value between image data of pixels positioned in the same coordinates in the $1c^{th}$ target block and the $1c^{th}$ reference block by the corresponding weight value c is obtained. Further, the weight processing unit 341 multiplies the SAD calculation result corresponding to the $1b^{th}$ target block input from the subtraction processing unit 3321 by a weight value (b−c) of a difference between the set weight values b and c (see the middle portion of FIG. 10A). Thereby, an SAD calculation result equal to an integrated SAD calculation result after multiplying a difference absolute value between image data of pixels positioned in the same coordinates in the $1b^{th}$ target block and the $1b^{th}$ reference block by the weight value (b−c) is obtained. Further, the weight processing unit 341 multiplies the SAD calculation result corresponding to the $1a^{th}$ target block input from the subtraction processing unit 3331 by a weight value (a−b−c) obtained by subtracting the weight values b and c from the set highest weight value a (see the lower portion of FIG. 10A). Thereby, an SAD calculation result equal to an integrated SAD calculation result after multiplying a difference absolute value between image data of pixels positioned in the same coordinates in the $1a^{th}$ target block and the $1a^{th}$ reference block by the weight value (a−b−c) is obtained.

Then, the weight processing unit 341 adds SAD calculation results after multiplying the weight values. That is, the SAD calculation results obtained by multiplication processes illustrated in the upper, middle, and lower portions of FIG. 10A are added. Thereby, after the pixel corresponding to the $1c^{th}$ target block is multiplied by the weight value c, the pixel corresponding to the $1b^{th}$ target block is multiplied by the weight value b, and the pixel corresponding to the $1a^{th}$ target block is multiplied by the weight value a, an SAD calculation result equal to an SAD calculation result obtained by integrating all values is obtained. The SAD calculation result obtained here is a final weighted SAD calculation result corresponding to the first target block (=$1c^{th}$ target block) corresponding to the channel ch1 of the image sensor 10 in which three types of weight values are set. Then, the weight processing unit 341 outputs the final weighted SAD calculation result corresponding to the $1c^{th}$ target block as the weighted SAD calculation result corresponding to the channel ch1 of the image sensor 10.

Also, in a multiplication process on an SAD calculation result corresponding to the above-described $1b^{th}$ target block, multiplication by the weight value (b−c) of the difference between the weight values b and c is performed to avoid a process of redundantly multiplying image data within the $1b^{th}$ target block redundantly included in the $1c^{th}$ target block by the weight value c. Also, in a multiplication process on an SAD calculation result corresponding to the above-described $1a^{th}$ target block, multiplication by the weight value (a−b−c) obtained by subtracting the weight values b and c from the weight value a is performed to avoid a process of redundantly multiplying image data within the $1a^{th}$ target block redundantly included in the $1c^{th}$ target block and the $1b^{th}$ target block by the weight values c and b.

Next, the weighting process by the weight processing unit 342 will be described with reference to FIG. 10B. As described above, the extended block SAD calculation unit 321 outputs a third extended SAD calculation result corresponding to the third extended target block illustrated in FIG. 9 and the $2c^{th}$ subtraction SAD calculation result corresponding to the $2c^{th}$ subtraction block to the subtraction processing unit 3312. Then, the subtraction processing unit 3312 subtracts the $2c^{th}$ subtraction SAD calculation result from the third extended SAD calculation result, and outputs the SAD calculation result corresponding to the $2c^{th}$ target block illustrated in FIGS. 8A and 8B to the weight processing unit 342 (see the upper portion of FIG. 10B). In addition, likewise, the extended block SAD calculation unit 322 outputs a second extended SAD calculation result corresponding to the second extended target block illustrated in FIG. 9 and the $2b^{th}$ subtraction SAD calculation result corresponding to the $2b^{th}$ subtraction block to the subtraction processing unit 3322. Then, the subtraction processing unit 3322 subtracts the $2b^{th}$ subtraction SAD calculation result from the second extended SAD calculation result, and outputs the SAD calculation result corresponding to the $2b^{th}$ target block illustrated in FIGS. 8A and 8B to the weight processing unit 342 (see the middle portion of FIG. 10B). In addition, likewise, the extended block SAD calculation unit 323 outputs a first extended SAD calculation result corresponding to the first extended target block illustrated in FIG. 9 and the $2a^{th}$ subtraction SAD calculation result corresponding to the $1a^{th}$ subtraction block, that is, the SAD calculation result of only the target pixel (6, 6), to the subtraction processing unit 3332. Then, the subtraction processing unit 3332 subtracts the $1a^{th}$ subtraction SAD calculation result from the first extended SAD calculation result, and outputs the SAD calculation result corresponding to the $2a^{th}$ target block illustrated in FIGS. 8A and 8B, that is, the SAD calculation result of only the target pixel (7, 6), to the weight processing unit 342 (see the lower portion of FIG. 10B).

Then, the weight processing unit 342 multiplies an SAD calculation result corresponding to the $2c^{th}$ target block input from the subtraction processing unit 3312 by the set lowest weight value c (see the upper portion of FIG. 10B). Thereby, an SAD calculation result equal to an integrated SAD calculation result after multiplying a difference absolute value between image data of pixels positioned in the same coordinates in the $2c^{th}$ target block and the $2c^{th}$ reference block by the corresponding weight value c is obtained. Further, the weight processing unit 342 multiplies the SAD calculation result corresponding to the $2b^{th}$ target block input from the subtraction processing unit 3322 by a weight value (b−c) of a difference between the set weight values b and c (see the middle portion of FIG. 10B). Thereby, an SAD calculation result equal to an integrated SAD calculation result after multiplying a difference absolute value between image data of pixels positioned in the same coordinates in the $2b^{th}$ target block and the $2b^{th}$ reference block by the corresponding weight value (b−c) is obtained. Further, the weight processing unit 342 multiplies the SAD calculation result corresponding to the $2a^{th}$ target block input from the subtraction processing unit 3332 by a weight value (a−b−c) obtained by subtracting the weight values b and c from the set highest weight value a (see the lower portion of FIG. 10B). Thereby, an SAD calculation result equal to an integrated SAD calculation result after multiplying a difference absolute value between image data of pixels positioned in the same coordinates in the $2a^{th}$ target block and the $2a^{th}$ reference block by the weight value (a−b−c) is obtained.

Then, the weight processing unit 342 adds SAD calculation results after multiplying the weight values. That is, the SAD calculation results obtained by multiplication processes illustrated in the upper, middle, and lower portions of FIG. 10B are added. Thereby, after the pixel corresponding to the $2c^{th}$ target block is multiplied by the weight value c, the pixel corresponding to the $2b^{th}$ target block is multiplied by the weight value b, and the pixel corresponding to the $2a^{th}$ target block is multiplied by the weight value a, an SAD calculation result equal to an SAD calculation result obtained by integrating all values is obtained. The SAD calculation result obtained here is a final weighted SAD calculation result corresponding to the second target block (=$2c^{th}$ target block) corresponding to the channel ch2 of the image sensor 10 in which three types of weight values are set. Then, the weight processing unit 342 outputs the final weighted SAD calculation result corresponding to the $2c^{th}$ target block as the weighted SAD calculation result corresponding to the channel ch2 of the image sensor 10.

Also, in a multiplication process on an SAD calculation result corresponding to the $2b^{th}$ target block and a multiplication process on an SAD calculation result corresponding to the $1a^{th}$ target block described above, the reason for multiplying by the weight value by which each SAD calculation result is multiplied after calculation of the weight values a to c is similar to the reason for the weighting process in the weight processing unit 341. That is, this is to avoid a process of redundantly multiplying image data redundant in each target block by the weight value.

According to the second embodiment, in the image processing device (image processing device 300), combinations, each of which includes an extended region SAD calculation unit and subtraction processing units equal in number to target pixels (a combination of the extended block SAD calculation unit 321 and subtraction processing units 3311 and 3312, a combination of the extended block SAD calculation unit 322 and subtraction processing units 3321 and 3322, and a combination of the extended block SAD calculation unit 323 and subtraction processing units 3331 and 3332), are provided to be equal in number to types (three types) of weight values (weight values a to c) set in pixels within the extended target block. The image processing device further includes (two) weight processing units (the weight processing units 341 and 342) equal in number to adjacent target pixels to be simultaneously correlated and configured to output weighted SAD calculation results (a weighted SAD calculation result corresponding to the channel ch1 of the image sensor 10 and a weighted SAD calculation result corresponding to the channel ch2 of the image sensor 10) obtained by performing weighting processes on SAD calculation results output from the subtraction processing units 3311 to 3332.

In addition, according to the second embodiment, in the image processing device 300, the combinations, each of which includes an extended region SAD calculation unit and subtraction processing units equal in number to target pixels, output SAD calculation results corresponding to the corresponding weight values a to c, and the weight processing units 341 and 342 multiply SAD calculation results in the corresponding target pixels output from the combinations, each of which includes an extended region SAD calculation unit and subtraction processing units equal in number to target pixels, by values based on the corresponding weight values a to c, and then output a weighted SAD calculation result corresponding to the channel ch1 of the image sensor 10 and a weighted SAD calculation result corresponding to the channel ch2 of the image sensor 10 obtained by adding SAD calculation results corresponding to the weight values multiplied here.

In addition, according to the second embodiment, in the image processing device 300, the first extended region SAD calculation unit (extended block SAD calculation unit 323), which is the extended region SAD calculation unit corresponding to a first weight value (weight value a), defines each of an extended target region of a first weight (first extended target block) which is the extended target block obtained by combining a first target region of the first weight ($1a^{th}$ target block) in which the weight value a is set in a first target block having a predetermined size including peripheral pixels to be correlated around a target pixel (6, 6) which has been input and a second target region of the first weight ($2a^{th}$ target block) in which the weight value a is set in a second target block having a predetermined size including peripheral pixels to be simultaneously correlated around an adjacent target pixel (7, 6) which has been simultaneously input and an extended reference region of the first weight (first extended reference block) which is the extended reference block obtained by combining a first reference region of the first weight ($1a^{th}$ reference block) in which the weight value a is set in a first reference block having a predetermined size corresponding to the first target block around a reference pixel (2, 2) corresponding to the target pixel (6, 6) and a second reference region of the first weight ($2a^{th}$ reference block) in which the weight value a is set in a second reference block having a predetermined size corresponding to the second target block around a reference pixel (3, 2) corresponding to the target pixel (7, 6), calculates difference absolute values between image data represented by pixel signals of pixels positioned in the same coordinates in the first extended target block and the first extended reference block, and outputs an extended SAD calculation result of the first weight (first extended SAD calculation result) which is the extended SAD calculation result obtained by performing the SAD calculation of integrating the calculated difference absolute values. The first subtraction processing unit of the first weight (subtraction processing unit 3331), which is the subtraction processing unit corresponding to the weight value a and corresponding to the target pixel (6, 6), outputs a first SAD calculation result of the first weight (the SAD calculation result corresponding to the $1a^{th}$ target block, that is, the SAD calculation result of only the target pixel (6, 6)) obtained by subtracting the SAD calculation result ($1a^{th}$ subtraction SAD calculation result) corresponding to a region of a pixel which is not included in the $1a^{th}$ target block (a region of a target pixel (7, 6)) within the first extended target block from the first extended SAD calculation result. The second subtraction processing unit of the first weight (subtraction processing unit 3332), which is the subtraction processing unit corresponding to the weight value a and corresponding to the target pixel (7, 6), outputs a second SAD calculation result of the first weight (the SAD calculation result corresponding to the $2a^{th}$ target block, that is, the SAD calculation result of only the target pixel (7, 6)) obtained by subtracting the SAD calculation result ($2a^{th}$ subtraction SAD calculation result) corresponding to a region of a pixel which is not included in the $2a^{th}$ target region (a region of the target pixel (6, 6)) within the first extended target region from the first extended SAD calculation result. A second extended region SAD calculation unit (extended block SAD calculation unit 322 or 321), which is the extended region SAD calculation unit corresponding to a second weight value (weight value b or c) which is less than the weight value a and set in a pixel of a region greater than a region of a pixel in which the weight value a is set, defines each of an extended target region of a second weight (second or third extended target block) which is the extended target block obtained by combining a first target region of the second weight ($1b^{th}$ or $1c^{th}$ target block) in which the weight value b or c is set in the first target block and a second target region of the second weight ($2b^{th}$ or $2c^{th}$ target block) in which the weight value b or c is set in the second target block and an extended reference region of the second weight (second or third extended reference block) which is the extended reference block obtained by combining a first reference region of the second weight ($1b^{th}$ or $1c^{th}$ reference block) in which the weight value b or c is set in the first reference block and a second reference region of the second weight ($2b^{th}$ or $2c^{th}$ reference block) in which the weight value b or c is set in the second reference block, calculates difference absolute values between image data represented by pixel signals of pixels positioned in the same coordinates in the second or third extended target block and the second or third extended reference block, and outputs an extended SAD calculation result of the second weight (second or third extended SAD calculation result) which is the extended SAD calculation result obtained by performing the SAD calculation of integrating the calculated difference absolute values. A first subtraction processing unit of the second weight (subtraction processing unit 3321 or 3311), which is the subtraction processing unit corresponding to the weight value b or c and corresponding to the target pixel (6, 6), outputs a first SAD calculation result of the second weight (an SAD calculation result corresponding to the $1b^{th}$ target block or an SAD calculation result corresponding to the $1c^{th}$ target block) obtained by subtracting the SAD calculation result ($1b^{th}$ or $1c^{th}$ subtraction SAD calculation result) corresponding to a region of a pixel which is not included in the $1b^{th}$ or $1c^{th}$ target block ($1b^{th}$ or $1c^{th}$ subtraction block) within the second or third extended target block from the second or third extended SAD calculation result. A second subtraction processing unit of the second weight (subtraction processing unit 3322 or 3312), which is the subtraction processing unit corresponding to the weight value b or c and corresponding to the target pixel (7, 6), outputs a second SAD calculation result of the second weight (an SAD calculation result corresponding to the $2b^{th}$ target block and an SAD calculation result corresponding to the $2c^{th}$ target block) obtained by subtracting the SAD calculation result ($2b^{th}$ or $2c^{th}$ subtraction SAD calculation result) corresponding to a region of a pixel which is not included in the $2b^{th}$ or $2c^{th}$ target block ($2b^{th}$ or $2c^{th}$ subtraction block) within the second or third extended target block from the second or third extended SAD calculation result. The first weight processing unit (weight processing unit 341), which is the weight processing unit corresponding to the target pixel (6, 6), multiplies the SAD calculation result corresponding to the $1a^{th}$ target block by a weight value obtained by subtracting the weight value b or the weight values b and c from the weight value a, multiplies the SAD calculation result corresponding to the $1b^{th}$ or $1c^{th}$ target block by a weight value obtained by subtracting the weight value c from the weight value b or the weight value c, and outputs a first weighted SAD calculation result (the weighted SAD calculation result corresponding to the channel ch1 of the image sensor 10) which is the weighted SAD calculation result obtained by adding the first SAD calculation results after multiplication here. The second weight processing unit (weight processing unit 342), which is the weight processing unit corresponding to the target pixel (7, 6), multiplies the SAD calculation result corresponding to the $2a^{th}$ target block by a weight value obtained by subtracting the weight value b or the weight values b and c from the weight value a, multiplies the SAD calculation result corresponding to the $2b^{th}$ target block and the SAD calculation result corresponding to the $2c^{th}$ target block by a weight value obtained by subtracting the weight value c from the weight value b or the weight value c, and outputs a second weighted SAD calculation result (the weighted SAD calculation result corresponding to the channel ch2 of the image sensor 10) which is the weighted SAD calculation result obtained by adding the second SAD calculation results after multiplication here.

As described above, in the image processing device 300 according to the second embodiment, as in the image processing device 100 according to the first embodiment, the SAD calculation is performed on the extended target block obtained by combining the first target block around the target pixel output from the channel ch1 of the image sensor 10 and the second target block around the target pixel output from the channel ch2 of the image sensor 10. At this time, in the image processing device 300 according to the second embodiment, the SAD calculation is performed for each extended target block obtained by combining the first weighted target block and the second weighted target block defined depending on the set weight values. Then, in the image processing device 300 according to the second embodiment, as in the image processing device 100 according to the first embodiment, the first subtraction SAD calculation result corresponding to the first subtraction block which is not included in the corresponding first weighted target block or the second subtraction SAD calculation result corresponding to the second subtraction block which is not included in the corresponding second weighted target block is subtracted from the extended SAD calculation result corresponding to each extended target block. Thereafter, in the image processing device 300 according to the second embodiment, a weighting process of adding SAD calculation results after multiplying the first and second weighted target blocks by corresponding weight values is performed. Thereby, even in the image processing device 300 according to the second embodiment, as in the image processing unit provided in the conventional imaging device, the weighted SAD calculation result corresponding to the first target block and the weighted SAD calculation result corresponding to the second target block can be simultaneously output.

Furthermore, in the image processing device 300 according to the second embodiment, the multiplication of the weight value for the difference absolute value performed for each piece of image data in the image processing unit provided in the conventional imaging device is performed for SAD calculation results of regions defined depending on the weight values (first and second weighted target blocks). That is, in the image processing device 300 according to the second embodiment, the weighting process is performed in a unified unit after the SAD calculation is performed on a plurality of pieces of image data. Thereby, the number of calculation circuits configured to perform the weighting process in the image processing device 300 according to the second embodiment can be less than the number of calculation circuits provided in the image processing unit provided in the conventional imaging device.

More specifically, for example, when a region of each of the first and second target blocks is a region of 5 pixels×5 pixels and three types of weight values are set in image data of each target block, it is necessary to provide calculation circuits for 5 pixels×5 pixels for two channels, that is, 50 (=5× 5×2) calculation circuits configured to perform weighting processes, in the image processing unit provided in the conventional imaging device. On the other hand, it is possible to obtain each weighted SAD calculation result by providing only calculation circuits configured to perform weighting processes corresponding to three types of weight values for two channels, that is, 6 (=3×2) calculation circuits configured to perform weighting processes, in the image processing device 300 according to the second embodiment. Thereby, in the image processing device 300 according to the second embodiment, it is possible to simultaneously output the weighted SAD calculation results for image data while suppressing an increase in the circuit scale of a circuit related to the SAD calculation in which image data is weighted compared to the conventional configuration.

Also, the case in which the weight value for the image data is set as illustrated in FIGS. 8A and 8B has been described in the second embodiment. However, a process of setting the weight value for the image data is not limited to the setting process described in the second embodiment. For example, it is possible to apply the concept of the present invention similarly even when the weight value is set as illustrated in FIGS. 11A and 11B.

Each of FIGS. 11A and 11B is a diagram schematically illustrating another example of a region of pixels on which the SAD calculations are simultaneously performed in the image processing device 300 according to the second embodiment. In FIG. 11A, a positional relationship between a first target block around a target pixel (6, 6) output from the channel ch1 of the image sensor 10 and a first reference block around a reference pixel (2, 2) corresponding to the target pixel (6, 6) output from the channel ch1 of the image sensor 10 is illustrated. In addition, in FIG. 11B, a positional relationship between a second target block around a target pixel (7, 6) output from the channel ch2 of the image sensor 10 and a second reference block around a reference pixel (3, 2) corresponding to the target pixel (7, 6) output from the channel ch2 of the image sensor 10 is illustrated. In addition, in FIGS. 11A and 11B, a state in which three types of weight values are set in image data within each of the first and second target blocks is illustrated.

In the image processing device 300 according to the second embodiment, each of the extended block SAD calculation units 321 to 323 defines the first and second weighted target blocks depending on the set weight values. More specifically, in FIGS. 11A and 11B, each of the $1c^{th}$ target block of the weight value c or more around the target pixel (6, 6) output from the channel ch1 of the image sensor 10 and the $2c^{th}$ target block of the weight value c or more around the target pixel (7, 6) output from the channel ch2 is defined. In addition, each of the $1b^{th}$ target block of the weight value b or more around the target pixel (6, 6) output from the channel ch1 of the image sensor 10 and the $2b^{th}$ target block of the weight value b or more around the target pixel (7, 6) output from the channel ch2 is defined. In addition, each of the $1a^{th}$ target block of the weight value a or more around the target pixel (6, 6) output from the channel ch1 of the image sensor 10 and the $2a^{th}$ target block of the weight value a or more around the target pixel (7, 6) output from the channel ch2 is defined.

In addition, each of the extended block SAD calculation units 321 to 323 defines the first and second weighted reference blocks corresponding to the defined first and second weighted target blocks. More specifically, in FIGS. 11A and 11B, each of the $1a^{th}$, $1b^{th}$, and $1c^{th}$ reference blocks around the reference pixel (2, 2) corresponding to the target pixel (6, 6) output from the channel ch1 of the image sensor 10 is defined. Likewise, each of the $2a^{th}$, $2b^{th}$, and $2c^{th}$ reference blocks around the reference pixel (3, 2) corresponding to the target pixel (7, 6) output from the channel ch2 of the image sensor 10 is defined.

Then, the extended block SAD calculation units 321 to 323 output extended SAD calculation results and first and second subtraction SAD calculation results, which are obtained by performing SAD calculation on extended target blocks obtained by extending the defined first and second weighted target blocks, to the subtraction processing units 3311 to 3332. Then, the subtraction processing units 3311 to 3332 subtract the first or second subtraction SAD calculation results from the extended SAD calculation results input from the extended block SAD calculation units 321 to 323. Thereafter, the weight processing units 341 and 342 perform a weighting process of multiplying SAD calculation results input from the subtraction processing units 3311 to 3332 by corresponding weight values and then adding SAD calculation results. Thereby, the image processing device 300 according to the second embodiment simultaneously outputs a weighted SAD calculation result corresponding to the first target block around the target pixel (6, 6) output from the channel ch1 of the image sensor 10 illustrated in FIG. 11A and a weighted SAD calculation result corresponding to the second target block around the target pixel (7, 6) output from the channel ch2 of the image sensor 10 illustrated in FIG. 11B.

In this manner, in the image processing device 300 according to the second embodiment, it is possible to simultaneously output the weighted SAD calculation result corresponding to the first target block and the weighted SAD calculation result corresponding to the second target block regardless of a state of the weight value set in image data within each of the first and second target blocks.

Also, in the second embodiment, an example of a configuration in which the image processing device 300 corresponds to the image sensor 10 configured to simultaneously output image data of two pixels adjacent in the horizontal direction (row direction) x is shown. However, the concept of the image processing device of the present invention is not limited to a configuration in which the direction of image data simultaneously output by the image sensor is the horizontal direction (row direction) x as in the image processing device 100 according to the first embodiment. The concept of the present invention can be applied similarly even when a configuration in which the image sensor simultaneously outputs image data is different.

For example, in the case of a configuration in which the image sensor simultaneously outputs image data of two pixels adjacent in the vertical direction (column direction) y, a region (block) in which each SAD calculation is performed in the order of input image data is only formed as illustrated in FIG. 5A, and its configuration and operation can be considered to be similar to those of the image processing device 300. In addition, for example, in the case of a configuration in which the image sensor simultaneously outputs image data of two pixels adjacent in the horizontal direction (row direction) x and image data of two pixels adjacent in the vertical direction (column direction) y, that is, simultaneously outputs image data of four pixels, the number of components provided in the image processing device 300 increases depending on input image data. More specifically, the configuration is considered to be similar to that of a modified example of the first embodiment illustrated in FIG. 6, and the number of subtraction processing units is increased by 6 and the number of weight processing units is increased by 2 so as to cope with the channels ch3 and ch4 of the image sensor in the image processing device 300 illustrated in FIG. 7. However, a region (block) in which each SAD calculation is performed is only formed as illustrated in FIG. 5B, and the operation of the image processing device of the above case can also be considered to be similar to that of the image processing device 300. Accordingly, a detailed description related to the configuration and operation of the image processing device when the configuration in which the image sensor simultaneously outputs image data is different will be omitted.

As described above, according to a mode for carrying out the present invention, in an imaging device equipped with a solid-state imaging device (image sensor) configured to simultaneously output a plurality of adjacent pixel signals from a plurality of channels corresponding to pixels, regions, in which SAD calculations corresponding to each channel are performed, are combined (extended) when SAD calculations for digital signals corresponding to pixel signals output from channels are simultaneously performed. Then, in the mode for carrying out the present invention, SAD calculation is performed for a region obtained by combining (extending) a region corresponding to each channel, and the SAD calculation result of a region which is not included in a region corresponding to each channel, that is, an extra (unnecessary) region in the region in which SAD calculation is performed in each channel, is subtracted from the SAD calculation result. Thereby, in the mode for carrying out the present invention, it is possible to reduce the number of calculation circuits provided to obtain the SAD calculation result compared to the conventional configuration in which SAD calculations for digital signals corresponding to pixel signals output from channels are simultaneously performed in separate calculation circuits by separately performing SAD calculation of a region corresponding to each channel. Thereby, in the mode for carrying out the present invention, it is possible to simultaneously perform SAD calculations on digital signals corresponding to pixel signals output from channels while suppressing an increase in the circuit scale of a circuit related to the SAD calculation.

In addition, according to the mode for carrying out the present invention, when a digital signal corresponding to a pixel signal output from each channel is weighted, each region in which SAD calculation is performed is defined depending on a weight value set in a digital signal. Then, in the mode for carrying out the present invention, a weighting process of performing SAD calculation for each defined region and then adding SAD calculation results obtained by multiplying a weight value corresponding to each region is performed. Thereby, in the mode for carrying out the present invention, it is possible to reduce the number of calculation circuits provided to perform a weighting process compared to a conventional configuration in which the SAD calculation and the weighting process on a region corresponding to each channel are performed for a digital signal. Thereby, in the mode for carrying out the present invention, it is possible to simultaneously perform SAD calculations after a weighting process is performed on digital signals corresponding to pixel signals output from channels while suppressing an increase in the circuit scale of a circuit related to the weighted SAD calculation.

Also, although the case in which a region of each target block in which SAD calculation is performed is a region of 5 pixels×5 pixels has been described in this embodiment, a size of the target block in which the SAD calculation is performed is not limited to the mode for carrying out the present invention. For example, even when the region of the target block in which the SAD calculation is performed is a region of 9 pixels×9 pixels, it is possible to similarly apply the concept of the present invention.

In addition, although the case in which three types of weight values are set in image data within each target block in which the SAD calculation is performed has been described in this embodiment, the weight value to be set in each piece of the image data within the target block is not limited to the mode for carrying out the present invention. For example, even when two types of weight values are set in image data within a target block and when four or more types of weight values are set, it is similarly possible to apply the concept of the present invention.

In addition, the case in which a solid-state imaging device (image sensor) mounted on an imaging device and configured to simultaneously output a plurality of pixel signals from a plurality of channels is the form in which two adjacent pixels are simultaneously output has been described in this embodiment. However, the form of the image sensor corresponding to the image processing device to which the concept of the present invention has been applied is not limited to the mode for carrying out the present invention. For example, even the form in which pixel signals of four pixels adjacent in the horizontal direction are simultaneously output and the form in which pixel signals of four pixels adjacent in the vertical direction are simultaneously output can be similarly applied to the concept of the present invention. In addition, for example, even in the form in which pixel signals of four pixels adjacent in the horizontal direction and pixel signals of four pixels adjacent in the vertical direction are simultaneously output, that is, the form in which pixel signals of eight pixels are simultaneously output, it is similarly possible to apply the concept of the present invention.

In addition, although the case in which the solid-state imaging device (image sensor) mounted on the imaging device is an image sensor of a Bayer arrangement has been described in this embodiment, the arrangement of pixels in the image sensor corresponding to the image processing device to which the concept of the present invention is applied is not limited to the mode for carrying out the present invention.

In addition, although the case in which image data on which the SAD calculation is performed is a digital signal corresponding to a pixel value represented by each pixel signal output from the solid-state imaging device (image sensor) has been described in this embodiment, the image data on which the SAD calculation is performed is not limited to the mode for carrying out the present invention. For example, the image data may be a digital value corresponding to each pixel included in an already formed image.

While preferred embodiments of the invention have been described and illustrated above, it should be understood that these are exemplary of the invention and are not to be considered as limiting. Additions, omissions, substitutions, and other modifications can be made without departing from the spirit and scope of the present invention. Accordingly, the invention is not to be considered as being limited by the foregoing description, and is only limited by the scope of the appended claims.

What is claimed is:

1. An image processing device, to which pixel signals of a plurality of adjacent pixels are simultaneously input, configured to simultaneously find correlations between a plurality of target pixels adjacent to each other and corresponding reference pixels with pixels around the plurality of target pixels for each of the plurality of target pixels, the image processing device comprising:
an extended region sum of absolute differences (SAD) calculation unit configured to define each of an extended target region obtained by combining a plurality of target regions predetermined for each of the plurality of target pixels adjacent to each other to be simultaneously correlated and an extended reference region, which corresponds to the extended target region, obtained by combining a plurality of reference regions predetermined for each of reference pixels corresponding to the plurality of target pixels, the extended region SAD calculation unit being configured to output an extended SAD calculation result obtained by performing SAD calculations based on values represented by pixel signals of pixels included in the defined extended target region and the defined extended reference region; and
subtraction processing units equal in number to the target pixels adjacent to each other to be simultaneously correlated, the subtraction processing units being configured to correspond to the plurality of target pixels and to output SAD calculation results obtained by performing subtraction processes based on the extended SAD calculation result and an SAD calculation result corresponding to a region of a peripheral pixel which is not included in a predetermined target region for the plurality of target pixels to which the subtraction processing units correspond.

2. The image processing device according to claim 1,
wherein the extended region SAD calculation unit defines each of the extended target region obtained by combining a first target region having a predetermined size including peripheral pixels to be correlated around a first target pixel which has been input and a second target region having a predetermined size including peripheral pixels to be simultaneously correlated around a second target pixel which has been simultaneously input and the extended reference region obtained by combining a first reference region having a predetermined size corresponding to the first target region around a first reference pixel corresponding to the first target pixel and a second reference region having a predetermined size corresponding to the second target region around a second reference pixel corresponding to the second target pixel, calculates difference absolute values between values represented by pixel signals of pixels positioned in the same coordinates in the extended target region and the extended reference region, and outputs the extended SAD calculation result obtained by performing the SAD calculation of integrating the calculated difference absolute values,
wherein a first subtraction processing unit, which is one of the subtraction processing units corresponding to the first target pixel, outputs a first SAD calculation result obtained by subtracting an SAD calculation result corresponding to a region of a pixel which is not included in the first target region within the extended target region from the extended SAD calculation result, and
wherein a second subtraction processing unit, which is another of the subtraction processing units corresponding to the second target pixel, outputs a second SAD calculation result obtained by subtracting an SAD calculation result corresponding to a region of a pixel which is not included in the second target region within the extended target region from the extended SAD calculation result.

3. The image processing device according to claim 2,
wherein the extended region SAD calculation unit outputs each of a first subtraction SAD calculation result obtained by performing the SAD calculation based on values represented by pixel signals of pixels positioned in the same coordinates in a region of pixels within the extended target region which is not included in the first target region and a region of pixels within the extended reference region which is not included in the first reference region corresponding to the region of pixels within the extended target region which is not included in the first target region and a second subtraction SAD calculation result obtained by performing the SAD calculation based on values represented by pixel signals of pixels positioned in the same coordinates in a region of pixels within the extended target region which is not included in the second target region and a region of pixels within the extended reference region which is not included in the second reference region corresponding to the region of pixels within the extended target region which is not included in the second target region,
wherein the first subtraction processing unit outputs the first SAD calculation result obtained by subtracting the first subtraction SAD calculation result from the extended SAD calculation result, and
wherein the second subtraction processing unit outputs the second SAD calculation result obtained by subtracting the second subtraction SAD calculation result from the extended SAD calculation result.

4. The image processing device according to claim 1,
wherein combinations, each of which includes the extended region SAD calculation unit and the subtraction processing units equal in number to the target pixels, are provided to be equal in number to types of weight values set in pixels within the extended target region, and
wherein the image processing device further comprises:
weight processing units equal in number to the target pixels adjacent to each other to be simultaneously correlated, the weight processing units being configured to output weighted SAD calculation results obtained by performing weighting processes on the SAD calculation results output from the subtraction processing units.

5. The image processing device according to claim 4,
wherein each of the combinations of the extended region SAD calculation unit and the subtraction processing units equal in number to the target pixels outputs each of the SAD calculation results corresponding to corresponding weight values, and wherein each of the weight processing units outputs each of the weighted SAD calculation results obtained by multiplying each of the SAD calculation results in the corresponding target pixels output from each of the combinations of the extended region SAD calculation unit and the subtraction processing units equal in number to the target pixels by each of values based on the corresponding weight values and then adding each of the multiplied SAD calculation results corresponding to the weight values.

6. The image processing device according to claim 5, wherein the first extended region SAD calculation unit, which is one of the extended region SAD calculation units corresponding to a first weight value, defines each of an extended target region of a first weight which is the extended target region obtained by combining a first target region of the first weight in which the first weight value is set in a first target region having a predetermined size including peripheral pixels to be correlated around a first target pixel which has been input and a second target region of the first weight in which the first weight value is set in a second target region having a predetermined size including peripheral pixels to be simultaneously correlated around a second target pixel which has been simultaneously input and an extended reference region of the first weight which is the extended reference region obtained by combining a first reference region of the first weight in which the first weight value is set in a first reference region having a predetermined size corresponding to the first target region around a first reference pixel corresponding to the first target pixel and a second reference region of the first weight in which the first weight value is set in a second reference region having a predetermined size corresponding to the second target region around a second reference pixel corresponding to the second target pixel, calculates difference absolute values between values represented by pixel signals of pixels positioned in the same coordinates in the extended target region of the first weight and the extended reference region of the first weight, and outputs an extended SAD calculation result of the first weight which is the extended SAD calculation result obtained by performing the SAD calculation of integrating the calculated difference absolute values, wherein a first subtraction processing unit of the first weight, which is one of the subtraction processing units corresponding to the first weight value and corresponding to the first target pixel, outputs a first SAD calculation result of the first weight obtained by subtracting the SAD calculation result corresponding to a region of a pixel which is not included in the first target region of the first weight within the extended target region of the first weight from the extended SAD calculation result of the first weight, wherein a second subtraction processing unit of the first weight, which is another of the subtraction processing units corresponding to the first weight value and corresponding to the second target pixel, outputs a second SAD calculation result of the first weight obtained by subtracting the SAD calculation result corresponding to a region of a pixel which is not included in the second target region of the first weight within the extended target region of the first weight from the extended SAD calculation result of the first weight, wherein a second extended region SAD calculation unit, which is another of the extended region SAD calculation units corresponding to a second weight value which is less than the first weight value and set in a pixel of a region greater than a region of a pixel in which the first weight value is set, defines each of an extended target region of a second weight which is the extended target region obtained by combining a first target region of the second weight in which the second weight value is set in the first target region and a second target region of the second weight in which the second weight value is set in the second target region and an extended reference region of the second weight which is the extended reference region obtained by combining a first reference region of the second weight in which the second weight value is set in the first reference region and a second reference region of the second weight in which the second weight value is set in the second reference region, calculates difference absolute values between values represented by pixel signals of pixels positioned in the same coordinates in the extended target region of the second weight and the extended reference region of the second weight, and outputs an extended SAD calculation result of the second weight which is the extended SAD calculation result obtained by performing the SAD calculation of integrating the calculated difference absolute values, wherein a first subtraction processing unit of the second weight, which is another of the subtraction processing units corresponding to the second weight value and corresponding to the first target pixel, outputs a first SAD calculation result of the second weight obtained by subtracting the SAD calculation result corresponding to a region of a pixel which is not included in the first target region of the second weight within the extended target region of the second weight from the extended SAD calculation result of the second weight, wherein a second subtraction processing unit of the second weight, which is another of the subtraction processing units corresponding to the second weight value and corresponding to the second target pixel, outputs a second SAD calculation result of the second weight obtained by subtracting the SAD calculation result corresponding to a region of a pixel which is not included in the second target region of the second weight within the extended target region of the second weight from the extended SAD calculation result of the second weight, wherein the first weight processing unit, which is one of the weight processing units corresponding to the first target pixel, multiplies the first SAD calculation result of the first weight by a weight value obtained by subtracting the second weight value from the first weight value, multiplies the first SAD calculation result of the second weight by the second weight value, and outputs a first weighted SAD calculation result which is the weighted SAD calculation result obtained by adding the first SAD calculation result of the first weight multiplied by the weight value and the first SAD calculation result of the second weight multiplied by the second weight value, and wherein the second weight processing unit, which is another of the weight processing units corresponding to the second target pixel, multiplies the second SAD calculation result of the first weight by a weight value obtained by subtracting the second weight value from the first weight value, multiplies the second SAD calculation result of the second weight by the second weight value, and outputs a second weighted SAD calculation result which is the weighted SAD calculation result obtained by adding the second SAD calculation result of the first weight multiplied by the weight value and the second SAD calculation result multiplied of the second weight by the second weight value.

7. An image processing method for use in an image processing device, to which pixel signals of a plurality of adjacent pixels are simultaneously input, configured to simultaneously find correlations between a plurality of target pixels adjacent to each other and corresponding reference pixels with pixels around the plurality of target pixels for each of the plurality of target pixels, the image processing method comprising:

an extended region SAD calculation procedure of defining each of an extended target region obtained by combining a plurality of target regions predetermined for each of the plurality of target pixels adjacent to each other to be simultaneously correlated and an extended reference region corresponding to the extended target region obtained by combining a plurality of reference regions predetermined for each of reference pixels corresponding to the plurality of target pixels, and outputting an extended SAD calculation result obtained by performing SAD calculation based on values represented by pixel signals of pixels included in the defined extended target region and the defined extended reference region; and subtraction processing procedures, which correspond to the plurality of target pixels, of outputting SAD calculation results obtained by subtraction processes based on the extended SAD calculation result and an SAD calculation result corresponding to a region of a peripheral pixel which is not included in a predetermined target region for the plurality of target pixels to which the subtraction processing procedures correspond, wherein the subtraction processing procedures are equal in number to the target pixels adjacent to each other to be simultaneously correlated.

8. An imaging device comprising:

a solid-state imaging device having a plurality of pixels and configured to simultaneously output a plurality of pixel signals obtained by photoelectrically converting signals of the plurality of pixels adjacent to each other; and the image processing device according to claim 1, to which the plurality of pixel signals of the plurality of pixels adjacent to each other are input from the solid-state imaging device, configured to simultaneously find correlations between the plurality of target pixels and the corresponding reference pixels with the pixels around the plurality of target pixels for each of the plurality of target pixels.

* * * * *